United States Patent
Yamamoto et al.

(10) Patent No.: US 12,060,116 B2
(45) Date of Patent: Aug. 13, 2024

(54) ACTUATOR WITH REVERSE INPUT BLOCKING CLUTCH, STEERING DEVICE, AND REVERSE INPUT BLOCKING CLUTCH CONTROL METHOD

(71) Applicant: NSK Ltd., Tokyo (JP)

(72) Inventors: Shin Yamamoto, Fujisawa (JP); Atsushi Maeda, Fujisawa (JP); Shohei Kaneko, Fujisawa (JP); Cyou Kyo, Fujisawa (JP); Hideyuki Saito, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/684,209

(22) PCT Filed: Jun. 13, 2023

(86) PCT No.: PCT/JP2023/021857
§ 371 (c)(1),
(2) Date: Feb. 16, 2024

(87) PCT Pub. No.: WO2023/248864
PCT Pub. Date: Dec. 28, 2023

(65) Prior Publication Data
US 2024/0239401 A1    Jul. 18, 2024

(30) Foreign Application Priority Data
Jun. 23, 2022   (JP) ................. 2022-101284

(51) Int. Cl.
*B62D 5/04* (2006.01)
*F16D 43/21* (2006.01)
(52) U.S. Cl.
CPC ............ *B62D 5/043* (2013.01); *F16D 43/211* (2013.01)

(58) Field of Classification Search
None
See application file for complete search history.

(56) References Cited

U.S. PATENT DOCUMENTS 3,051,282 A * 8/1962 Greene ..................... F16D 3/50
                                                         74/530
2,031,186 A * 2/1963 Still ........................ B60T 7/12
                                                        192/223

(Continued)

FOREIGN PATENT DOCUMENTS

| JP | 2004-284441 A | 10/2004 |
| JP | 2012-229764 A | 11/2012 |
| WO | 2021/107073 A1 | 6/2021 |

OTHER PUBLICATIONS

International Search Report for PCT/JP2023/021857 dated Sep. 5, 2023 (PCT/ISA/210).

*Primary Examiner* — Daniel L Greene
(74) *Attorney, Agent, or Firm* — Sughrue Mion, PLLC

(57) ABSTRACT

An actuator with reverse input blocking clutch has a function of switching the reverse input blocking clutch to a state in which torque can be transmitted between an input member and an output member, in a state in which reverse torque is input to the output member from an output-side mechanism, by applying torque to the input member by an actuator in an opposite direction to a direction of the reverse torque, and then by giving an instruction to the actuator to apply torque having a magnitude smaller than a magnitude of the reverse torque to the input member in the opposite direction, transmitting the reverse torque to the input member.

12 Claims, 13 Drawing Sheets

(56) References Cited

U.S. PATENT DOCUMENTS

| | | | | |
|---|---|---|---|---|
| 6,871,735 B2* | 3/2005 | Kawai | ................... | F16D 41/105 |
| | | | | 192/38 |
| 8,886,428 B2 | 11/2014 | Mori et al. | | |
| 11,339,839 B2* | 5/2022 | Toyoda | ................... | F16D 43/26 |
| 2016/0185383 A1* | 6/2016 | Fujita | ..................... | F16D 41/00 |
| | | | | 180/444 |
| 2018/0347643 A1* | 12/2018 | Itomi | ...................... | F16D 15/00 |
| 2021/0261186 A1* | 8/2021 | Hikida | ................... | B62D 15/02 |
| 2022/0042555 A1* | 2/2022 | Dohi | ..................... | F16D 43/211 |
| 2022/0397163 A1* | 12/2022 | Dohi | ....................... | F16D 51/50 |

\* cited by examiner

ACTUATOR WITH REVERSE INPUT BLOCKING CLUTCH, STEERING DEVICE, AND REVERSE INPUT BLOCKING CLUTCH CONTROL METHOD

CROSS REFERENCE TO RELATED APPLICATIONS

This application is a National Stage of International Application No. PCT/JP2023/021857 filed Jun. 13, 2023, claiming priority based on Japanese Patent Application No. 2022-101284 filed Jun. 23, 2022.

TECHNICAL FIELD

The present disclosure relates to an actuator equipped with a reverse input blocking clutch that has a function of completely blocking torque reversely input to an output member and not transmitting torque to an input member, a steering device equipped with the actuator, and a control method for controlling the reverse input blocking clutch.

BACKGROUND ART

A reverse input blocking clutch includes an input member connected to an input side mechanism such as a drive source, and an output member connected to an output side mechanism such as a speed reduction mechanism, and has a function of transmitting torque input to the input member to the output member, and a function of locking, or in other words, completely blocking torque that is reversely input to the output member and not transmitting the torque to the input member.

Reverse input blocking clutches are broadly classified into locking type and free type, depending on the mechanism for blocking reverse input torque to the output member. The locking-type reverse input blocking clutch includes a mechanism that locks the rotation of the output member when reverse torque is input to the output member. On the other hand, a free-type reverse input blocking clutch includes a mechanism that causes the output member to idle when torque is reversely input to the output member. Whether to use a locking-type reverse input blocking clutch or a free-type reverse input blocking clutch is determined as appropriate depending on the intended use of the device incorporating the reverse input blocking clutch.

WO 2021/107073 describes a locking-type reverse input blocking clutch. The reverse input blocking clutch described in WO 2021/107073 includes a pressed member having a pressed surface, an input member having an input-side engaging portion, an output member having an output-side engaging portion, and an engaging element having an input-side engaged portion, an output-side engaged portion, and a pressing surface.

When torque is input to the input member, the engaging element, due to the input-side engaging portion engaging with the input-side engaged portion, moves in a direction that separates the pressing surface from the pressed surface and causes the output-side engaged portion to engage with the output-side engaging portion, thereby transmitting torque input to the input member to the output member.

On the other hand, when torque is reversely input to the output member, the engaging element, due to engagement between the output-side engaging portion and the output-side engaged portion, moves in a direction that brings the pressing surface closer to the pressed surface, and causes the pressing surface and the pressed surface to frictionally engage. This locks the rotation of the output member.

In the reverse input blocking clutch described in WO 2021/107073, regardless of the rotational direction of the input member, torque input to the input member can be transmitted to the output member through the engaging element, and regardless of the rotational direction of the output member, it is possible to completely block the torque reversely input to the output member and prevent the torque from being transmitted to the input member.

CITATION LIST

Patent Literature

Patent Literature 1: WO 2021/107073

SUMMARY OF INVENTION

Technical Problem

In a locking-type reverse input blocking clutch, when torque in a predetermined direction is reversely input to the output member, if torque is input to the input member in the same direction as the reversely input torque to the output member, that is, in the predetermined direction, there is a possibility that the rotation of the input member and the output member will not be smooth.

For example, in the reverse input blocking clutch described in WO 2021/107073, when torque in a predetermined direction is reversely input to the output member, the engaging element moves in a direction that brings the pressing surface closer to the pressed surface, which causes the pressing surface to be brought into frictional engagement with the pressed surface. This locks the rotation of the output member. In this state, when torque is input in the predetermined direction to the input member, the engaging element, due to the input-side engaging portion engaging with the input side engaged portion, moves in a direction that separates the pressing surface from the pressed surface, which causes the output-side engaged portion to engage with the output-side engaging portion. This allows torque transmission between the input member and the output member, causing the input member and the output member to rotate in the predetermined direction.

At this time, if the rotational frequency of the output member is higher than the rotational frequency of the input member, that is, the rotation speed of the output member is faster than the rotation speed of the input member, the engaging element, due to the engagement between the output-side engaging portion and the output-side engaged portion, immediately moves in a direction that brings the pressing surface closer to the pressed surface, which causes the pressing surface to frictionally engage with the pressed surface, and rotation of the output member is locked. Even in this state, torque in the predetermined direction is input to the input member, and thus at the next moment, torque transmission is allowed between the input member and the output member due to the input-side engaging portion engaging with the input-side engaged portion, and the input member and output member are rotated in the predetermined direction.

As described above, when a torque in a predetermined direction is reversely input to the output member, if a torque in the same direction as the torque reversely input to the output portion is input to the input member, there is a possibility of a jerking phenomenon to occur, in which the input member and the output member intermittently rotate in a predetermined direction, while an unlocked state where the input member and output member can rotate in a predetermined direction and a locked state where the input member and output member cannot rotate are alternately repeated in short periods of time. If such a phenomenon occurs, there is a possibility that the behavior of a mechanical element connected to the output member will not be smooth.

An object of the technique according to the present disclosure is to provide an actuator with reverse input blocking clutch and steering device capable of preventing an occurrence of a phenomenon in which a rotatable state and a non-rotatable state of an input member and an output member alternate repeatedly in a short period of time, and also to achieve a control method for controlling the reverse input blocking clutch.

Solution to Problem

An actuator with reverse input blocking clutch according to one aspect of the present disclosure includes an actuator and a reverse input blocking clutch.

The reverse input blocking clutch has an input member rotatably driven by the actuator and an output member connected to an output-side mechanism so as to transmit torque. In addition, when torque is input to the input member from the actuator in a state in which torque is not reversely input to the output member from the output-side mechanism, the reverse input blocking clutch transmits the torque input to the input member to the output member; and when torque is reversely input to the output member from the output-side mechanism in a state in which torque is not input to the input member from the actuator, the reverse input blocking clutch locks rotation of the output member.

The actuator rotationally drives the input member.

Particularly, in the actuator with reverse input blocking clutch according to one aspect of the present disclosure,
the actuator with reverse input blocking clutch has a function of switching the reverse input blocking clutch to a state in which torque can be transmitted between the input member and the output member, in a state in which torque is being reversely input to the output member from the output-side mechanism, by the actuator applying torque to the input member in an opposite direction to a direction of the torque that is reversely input to the output member from the output side mechanism, and then continuously giving an instruction to the actuator to apply torque having a magnitude smaller than a magnitude of the torque being reversely input to the output member from the output side mechanism to the input member in the opposite direction, transmitting the torque being reversely input to the output member from the output side mechanism to the input member.

In the actuator with reverse input blocking clutch according to one aspect of the present disclosure, the actuator may include an electric motor.

In the actuator with reverse input blocking clutch according to one aspect of the present disclosure, the reverse input blocking clutch may include a pressed member, the input member, the output member, and an engaging element.

The pressed member has a pressed surface on an inner peripheral surface thereof.

The input member has an input-side engaging portion arranged on an inner side in a radial direction of the pressed surface, and is rotatably supported coaxially with the pressed surface.

The output member has an output-side engaging portion arranged farther on the inner side in the radial direction than the input-side engaging portion on the inner side in the radial direction of the pressed surface, and is rotatably supported coaxially with the pressed surface.

The engaging element has a pressing surface that faces the pressed surface, an input-side engaged portion capable of engaging with the input-side engaging portion, and an output-side engaged portion capable of engaging with the output-side engaging portion, and is arranged so as to move in a first direction that is a direction in which the pressing surface separates from or approaches the pressed surface.

Furthermore, the engaging element, when torque is input to the input member from the actuator, moves in a direction in which the pressing surface is separated from the pressed surface in the first direction due to engagement between the input-side engaging portion and the input-side engaged portion, allowing torque transmission between the input member and the output member, whereas, when torque is reversely input to the output member from the output-side mechanism in a state in which torque is not being input to the input member from the actuator, the engagement element is pressed in a direction that brings the pressing surface closer to the pressed surface in the first direction, causing the pressing surface to frictionally engage with the pressed surface.

In the actuator with reverse input blocking clutch according to one aspect of the present disclosure, the engaging element may have two pressing surfaces respectively configured by the above pressing surface at two positions spaced apart in a circumferential direction on an outer side surface in the radial direction thereof.

In the actuator with reverse input blocking clutch according to one aspect of the present disclosure,
in a state in which, as the output member rotates to one side in the circumferential direction, the two pressing surfaces are pressed against the pressed surface, and as the input member rotates to the other side in the circumferential direction, the input-side engaging portion engages with the input-side engaged portion, a distance in a second direction perpendicular to both the first direction and a rotation center of the input member between a contact portion between the input-side engaging portion and the input-side engaged portion and the rotation center of the input member is smaller than a distance in the second direction between a contact portion between the output-side engaging portion and the output-side engaged portion and a rotation center of the output member; and
in a state in which torque is reversely input to the output member and the two pressing surfaces are in contact with the pressed surface, the contact portion between the output-side engaging portion and the output-side engaged portion is located on a side closer to the rotation center of the output member in the first direction than an imaginary line connecting a contact portion between one pressing surface of the two pressing surfaces and the pressed surface and the rotation center of the output member.

In the actuator with reverse input blocking clutch according to one aspect of the present disclosure,
in a state in which, as the output member rotates to one side in a circumferential direction, the two pressing surfaces are pressed against the pressed surface, and as the input member rotates to the other side in the circumferential direction, the input-side engaging portion engages with the input-side engaged portion, a distance in a second direction perpendicular to both the first direction and a rotation center of the input member between a contact portion between the input-side engaging portion and the input-side engaged portion and the rotation center of the input member is larger than a distance in the second direction between a contact portion between the output-side engaging portion and the output-side engaged portion and the rotation center of the output member; and in a state in which torque is reversely input to the output member and the two pressing surfaces are in contact with the pressed surface, the contact portion between the output-side engaging portion and the output-side engaged portion is located on a side closer to the rotation center of the output member in the first direction than an imaginary line connecting a contact portion between one pressing surface of the two pressing surfaces and the pressed surface and the rotation center of the output member.

In the actuator with reverse input blocking clutch according to one aspect of the present disclosure, the reverse input blocking clutch may include two engaging elements, each of which is configured by the above engaging element.

In the actuator with reverse input blocking clutch according to one aspect of the present disclosure, the reverse input blocking clutch may include an elastic member that elastically biases the engaging element in a direction that brings the pressing surface closer to the pressed surface.

A steering device according to one aspect of the present disclosure includes:

an actuator with reverse input blocking clutch having an output member; and a linear motion mechanism having a rod that is supported so as to perform linear motion and is connected to steered wheels so that a direction of the steered wheels changes in accordance with the linear motion, the linear motion mechanism configured to convert rotational motion of the output member into linear motion of the rod.

Particularly, in the steering device according to one embodiment of the present disclosure, the actuator with reverse input blocking clutch is configured by the actuator with reverse input blocking clutch according to one embodiment of the present disclosure.

In the steering device according to one aspect of the present disclosure, the rod includes a spiral male ball screw groove on an outer peripheral surface thereof; and the linear motion mechanism, further includes:

a ball nut having a spiral female ball screw groove on an inner peripheral surface thereof and rotationally driven by the output member; and a plurality of balls rotatably arranged between the male ball screw groove and the female ball screw groove.

In this case, the linear motion mechanism is configured by a ball screw device.

In the steering device according to one aspect of the present disclosure, the steered wheels are rear wheels.

In a reverse input blocking clutch that is a target of a control method for a reverse input blocking clutch according to one aspect of the present disclosure, the reverse input blocking clutch includes an input member that is rotatably driven by an actuator and an output member that is connected to an output-side mechanism so as to transmit torque, and when torque is input to the input member from the actuator in a state in which torque is not reversely input to the output member from the output-side mechanism, is configured to transmit torque that is input to the input member to the output member; and when torque is reversely input to the output member from the output-side mechanism in a state in which torque is not input to the input member from the actuator, is configured to lock rotation of the output member.

Particularly, in the control method for a reverse input blocking clutch according to one aspect of the present disclosure, the control method comprising, in a case where a predetermined condition is met, switching the reverse input blocking clutch to a state in which torque can be transmitted between the input member and the output member, in a state in which torque is being reversely input to the output member from the output-side mechanism, by the actuator applying torque to the input member in an opposite direction to a direction of the torque being reversely input to the output member from the output side mechanism, and then continuously giving an instruction to the actuator to apply torque having a magnitude smaller than a magnitude of the torque being reversely input to the output member from the output side mechanism to the input member in the opposite direction, transmitting the torque being reversely input to the output member from the output side mechanism to the input member.

For example, a reverse input blocking clutch that is a target of the reverse input blocking clutch control method according to one aspect of the present disclosure may include a pressed member, the input member, the output member, and an engaging element.

The pressed member has a pressed surface on an inner peripheral surface thereof.

The input member has an input-side engaging portion arranged on an inner side in a radial direction of the pressed surface, and is rotatably supported coaxially with the pressed surface.

The output member has an output-side engaging portion arranged farther on the inner side in the radial direction than the input-side engaging portion on the inner side in the radial direction of the pressed surface, and is rotatably supported coaxially with the pressed surface.

The engaging element has a pressing surface that faces the pressed surface, an input-side engaged portion capable of engaging with the input-side engaging portion, and an output-side engaged portion capable of engaging with the output-side engaging portion, and is arranged so as to be move in a first direction that is a direction in which the pressing surface separates from or approaches the pressed surface.

Furthermore, the engaging element, when torque is input to the input member from the actuator, moves in a direction in which the pressing surface is separated from the pressed surface in the first direction due to engagement between the input-side engaging portion and the input-side engaged portion, allowing torque transmission between the input member and the output member, whereas, when torque is reversely input to the output member from the output-side mechanism in a state in which torque is not being input to the input member from the actuator, the engagement element is pressed in a direction that brings the pressing surface closer to the pressed surface in the first direction, causing the pressing surface to frictionally engage with the pressed surface.

Effect of Invention

With the actuator with reverse input blocking clutch according to one aspect of the present disclosure, it is possible to prevent the occurrence of a jerking phenomenon in which a rotatable state and a non-rotatable state of the input member and the output member are alternately repeated in a short period of time when unlocking the lock.

DESCRIPTION OF EMBODIMENTS

First Example

Figure 1:
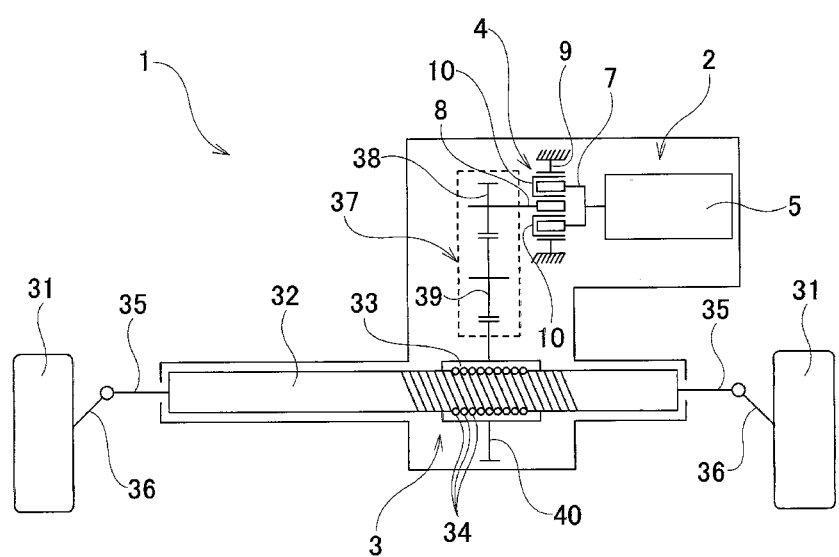
FIG. 1 is a schematic diagram illustrating a steering device of a first example of an embodiment according to the present disclosure.
Figure 2:
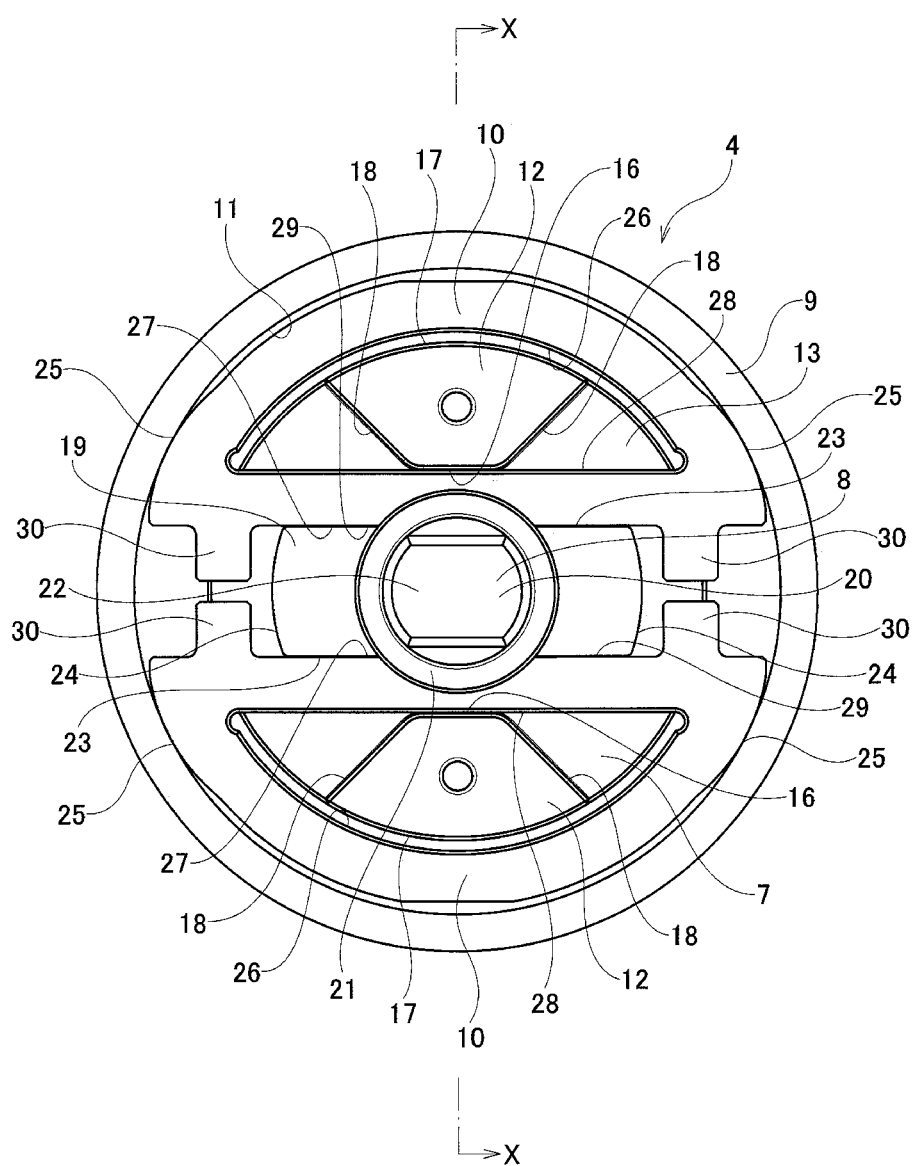
FIG. 2 is an end view of a reverse input blocking clutch of the steering device of the first example, as viewed from the output member side.
Figure 3:
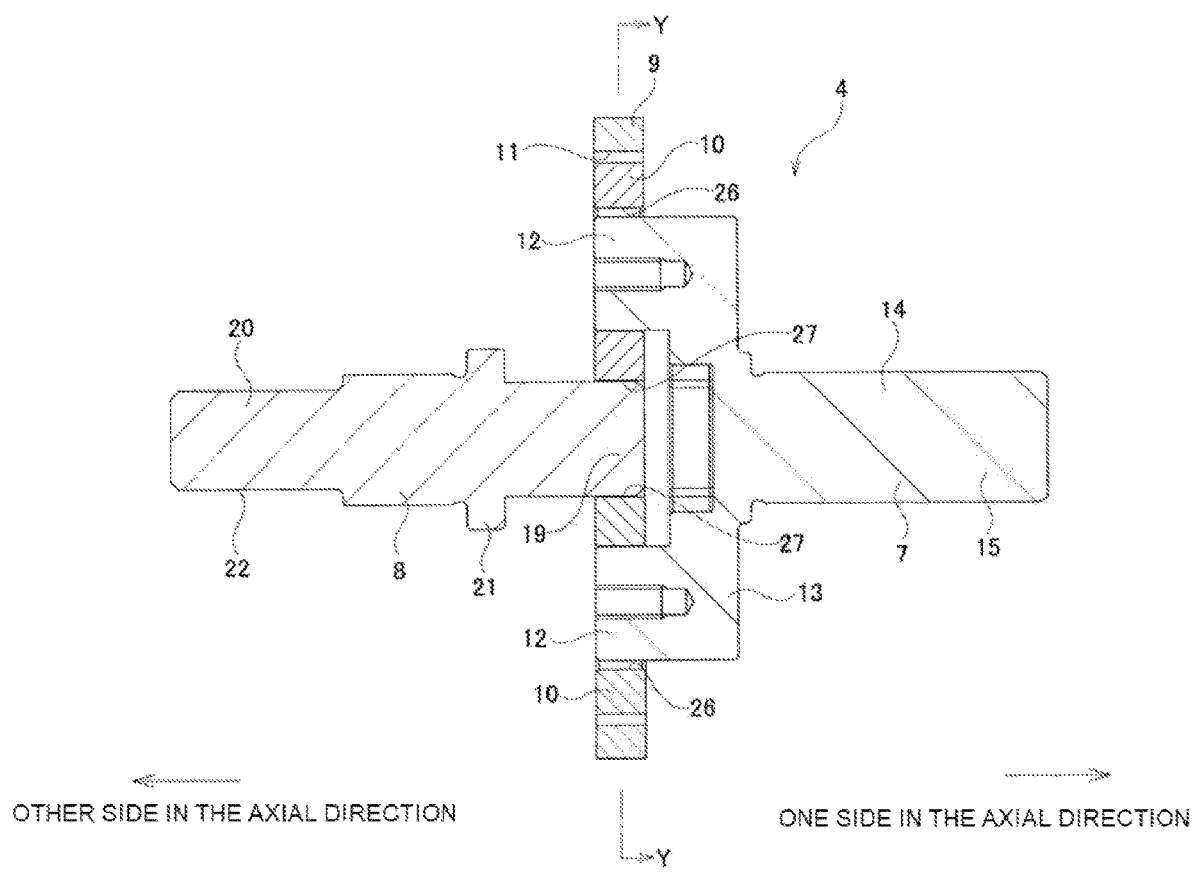
FIG. 3 is a cross-sectional view taken along line X-X in FIG. 2.

A first example of an embodiment according to the present disclosure will be described with reference to FIG. 1 to FIG. 8C. The present example is an example in which an actuator with reverse input blocking clutch according to an embodiment according to the present disclosure is applied to a steering device for rear wheels. The steering device 1 of the present example includes an actuator with reverse input blocking clutch 2 and a linear motion mechanism 3 that is an output-side mechanism. The steering device 1 of the present example is a steering device for rear wheels. However, in a case of implementing the technique according to the present disclosure, it is also possible to apply the steering device 1 of the present example to a steering device for front wheels. Moreover, it is also possible to apply the actuator with reverse input blocking clutch 2 of the present example to various mechanical devices. In this case as well, the configuration of the steering device or the actuator with reverse input blocking clutch is basically the same as in the present example.

In a vehicle equipped with the steering device 1 of the present example, a sensor detects a vehicle state such as a rotation amount and rotation speed of a steering wheel of a steering device (not illustrated), vehicle speed, and/or surrounding conditions, and based on information from the sensor, an ECU (not illustrated) controls the amount and direction of energization to the actuator 5.

(Actuator with Reverse Input Blocking Clutch)

The actuator with reverse input blocking clutch 2 of the present example includes an actuator 5 and a reverse input blocking clutch 4.

The actuator 5 rotationally drives an input member 7 of the reverse input blocking clutch 4. In the present example, the actuator 5 includes an electric motor as a drive source.

Note that in a case of implementing the technique according to the present disclosure, an engine may also be applied as a drive source for the actuator. In addition, the actuator may also include a speed reducer between the drive source and the input member of the reverse input blocking clutch.

The reverse input blocking clutch 4 includes the input member 7 that is rotationally driven by the actuator 5, and an output member 8 that is connected to a ball nut 33 of the linear motion mechanism 3, which is an output-side mechanism, so as to transmit torque. The input member 7 and the output member 8 are arranged coaxially with each other.

When torque is input from the actuator 5 to the input member 7 in a state in which torque is not reversely input from the linear motion mechanism 3 to the output member 8, the reverse input blocking clutch 4 transmits the torque input to the input member 7 to the output member 8 regardless of the rotational direction of the input member 7. More specifically, when a torque having a magnitude greater than a predetermined torque is input from the actuator 5 to the input member 7 in a state in which torque is not reversely input from the linear motion mechanism 3 to the output member 8, the torque input to the input member 7 is transmitted to the output member 8 regardless of the rotation direction of the input member 7. That is, the input member 7 and the output member 8 rotate together.

When torque is reversely input from the linear motion mechanism 3 to the output member 8 in a state in which torque is not input from the actuator 5 to the input member 7, the reverse input blocking clutch 4 locks the rotation of the output member 8 regardless of the rotation direction of the output member 8. More specifically, when a torque greater than a predetermined locking torque is reversely input from the linear motion mechanism 3 to the output member 8 in a state in which torque is not input from the actuator 5 to the input member 7, the reverse input blocking clutch 4 locks the rotation of the output member 8. In other words, the torque reversely input from the linear motion mechanism 3 to the output member 8 is completely blocked and not transmitted to the input member 7.

The locking torque switches the reverse input blocking clutch 4 to the locked state as the output member 8 rotates in a state in which torque is not input to the input member 7 from the actuator 5, that is, the locking torque is the minimum amount of torque required for the output member 8 to switch the output member 8 to the locked state. More specifically, in the present example, the locking torque is the minimum required torque of the output member 8 in order to cause a pressing surface 25 of an engaging element 10 to frictionally engage with a pressed surface 11 of a pressed member 9 in a state in which torque is not input from the actuator 5 to the input member 7, and is the same regardless of the rotation direction of the output member 8.

In the present example, the reverse input blocking clutch 4 includes the pressed member 9, the input member 7, the output member 8, and the engaging element 10. The reverse input blocking clutch 4 of the present example includes two engaging elements 10.

The pressed member 9 has a cylindrical shape, and rotation of the pressed member 9 is restrained by being fixed to another member (not illustrated), such as a housing, or by being provided integrally with another member. The pressed member 9 has a pressed surface 11 that is a cylindrical concave surface on the inner peripheral surface thereof.

The input member 7 has an input-side engaging portion 12 arranged on an inner side in a radial direction of the pressed surface 11, and is rotatably supported coaxially with the pressed surface 11. The input member 7 is rotationally driven by the actuator 5.

In the present example, the input member 7 includes a base plate portion 13, an input shaft portion 14, and the input-side engaging portion 12.

The base plate portion 13 has a substantially circular end surface shape when viewed from the axial direction.

The input shaft portion 14 protrudes toward one side in an axial direction from a center portion of one side surface in the axial direction (the right side surface in FIG. 3) of the base plate portion 13. The input shaft portion 14 has an input shank portion 15 at a portion on the one side in the axial direction. In the present example, the input shank portion 15 has a width across flat shape including a pair of mutually parallel flat surfaces on an outer peripheral surface. However, the input shank portion 15 may have any shape as long as the input shank portion 15 can be connected to the actuator 5 such that torque can be transmitted. In addition, the input shaft portion and the output shaft of the electric motor, which is the actuator, may be integrally configured.

The input member 7 includes the same number of input-side engaging portions 12 as the number of engaging elements 10. That is, in the present example, the input member 7 includes two input-side engaging portions 12.

The input-side engaging portions 12 respectively have a substantially fan-shaped or substantially trapezoidal end surface shape when viewed from the axial direction, and protrude toward the other side in the axial direction from two positions on the opposite side in the radial direction of a side surface on the other side in the axial direction (left side surface in FIG. 3) of the base plate portion 13. The two input-side engaging portions 12 are spaced apart from each other in the radial direction of the input member 7. Therefore, each of the input-side engaging portions 12 is arranged at a portion of the side surface on the other side in the axial direction of the base plate portion 13 that is separated toward the outer side in the radial direction from the rotation center O. Moreover, each input-side engaging portion 12 has a symmetrical shape in a circumferential direction.

In the present example, inner side surfaces 16 in the radial direction of the input-side engaging portions 12 are configured by mutually parallel flat surfaces, and outer side surfaces 17 of the input-side engaging portions 12 have the same cylindrical contour as the outer peripheral surface of the base plate portion 13. Furthermore, a pair of side surfaces 18 in the circumferential direction of each of the input-side engaging portions 12 are configured by flat surfaces that are inclined in a direction away from each other toward the outer side in the radial direction.

The output member 8 has an output-side engaging portion 19 arranged farther on the inner side in the radial direction than the input-side engaging portion 12 on the inner side in the radial direction of the pressed surface 11, and is rotatably supported coaxially with the pressed surface 11. In the present example, the output member 8 has an output shaft portion 20 and the output-side engaging portion 19.

The output shaft portion 20, at an end portion on the one side in the axial direction, has a flange portion 21 projecting toward the outer side in the radial direction, and has an output shank portion 22 at an end portion on the other side in the axial direction. In the present example, the output shank portion 22 has a width across flat shape including a pair of mutually parallel flat surfaces on the outer peripheral surface. A drive gear 38, which is a torque output portion of the actuator with reverse input blocking clutch 2, is externally fitted onto the output shank part 22 so as to transmit torque. However, the output shank portion 22 may have any shape as long as the output shank portion 22 can be connected to the drive gear 38, which is the torque output portion of the actuator with reverse input blocking clutch 2, so as to transmit torque.

The output side engaging portion 19 has a cam function. That is, the distance from the rotation center O of the output member 8 to the outer peripheral surface of the output-side engaging portion 19 is not constant in the circumferential direction. In the present example, the output-side engaging portion 19 has a substantially rectangular or substantially elliptical end surface shape when viewed from the axial direction, and protrudes out from a center portion of the end surface on the one side in the axial direction of the output shaft portion 20 toward the one side in the axial direction. That is, the outer peripheral surface of the output-side engaging portion 19 comprises a pair of mutually parallel flat surfaces 23 and a pair of convex curved surfaces 24, each of which is partially cylindrical. Therefore, the distance from the rotation center O of the output member 8 to the outer peripheral surface of the output-side engaging portion 19 is not constant in the circumferential direction. Note that in the present example, the pair of convex curved surfaces 24 are configured by partial cylindrical surfaces centered on the rotation center O of the output member 8.

The output-side engaging portion 19 is plane symmetrical with respect to a virtual plane that passes through the rotation center O of the output member 8 and is orthogonal to the pair of flat surfaces 23, and is plane symmetrical with respect to a virtual plane that passes through the rotation center O of the output member 8 and is parallel to the pair of flat surfaces 23. The output-side engaging portion 19 is arranged at an inner side in the radial direction of the input-side engaging portions 12. That is, in the present example, the output-side engaging portion 19 is arranged between the two input-side engaging portions 12.

Each engaging element 10 has a pressing surface 25 that faces the pressed surface 11, an input-side engaged portion 26 that can engage with the input-side engaging portion 12, and an output-side engaged portion 27 that can engage with the output-side engaging portion 19.

Figure 4:
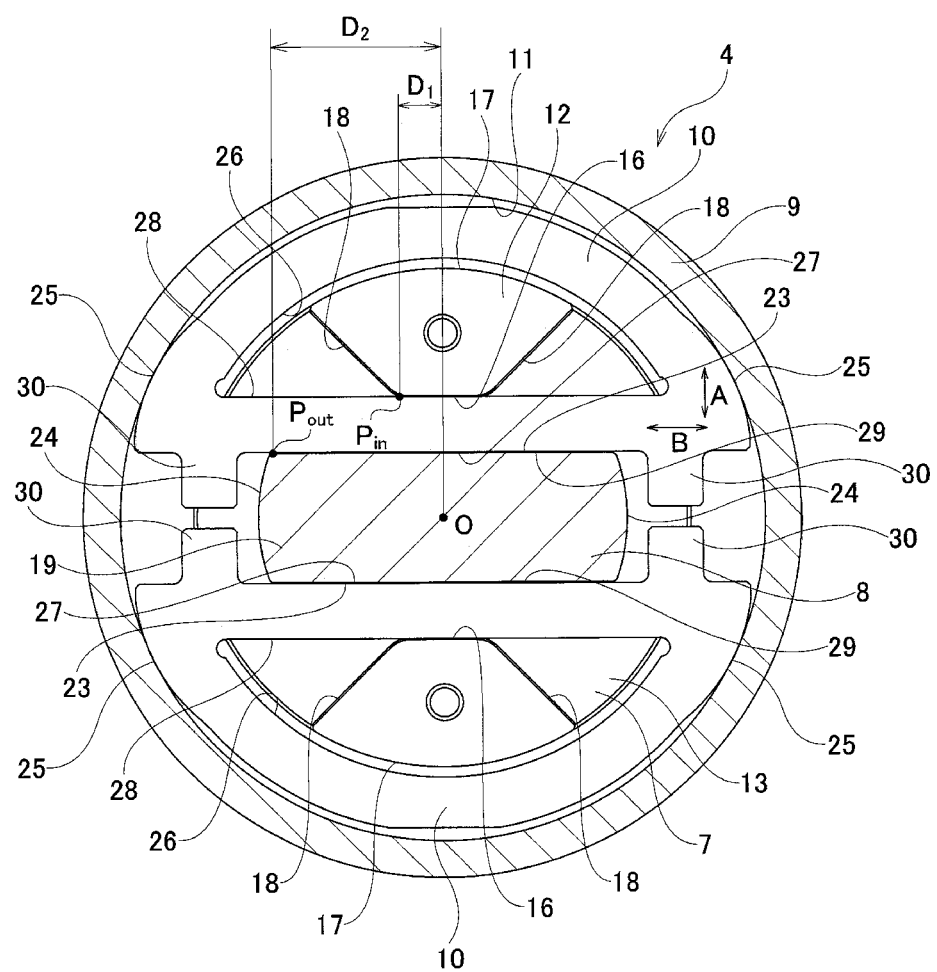
FIG. 4 is a cross-sectional view taken along line Y-Y in FIG. 3.

The radial direction with respect to the engaging element 10 refers to the direction perpendicular to the flat surface portion 29 provided on the inner side surface in the radial direction, as illustrated by arrow A in FIG. 4, and the width direction respect to the engaging element 10 refers to a direction parallel to the flat surface portion 29 indicated by arrow B in FIG. 4. In the present example, the radial direction with respect to the engaging elements 10 is a direction in which the pair of pressing surfaces 25 of the engaging elements 10 move when moving away from or approaching the pressed surface 11, and corresponds to a first direction, and the width direction with respect to the engaging elements 10 corresponds to a second direction orthogonal to both the first direction and the rotation center O of the input member 7.

In the present example, each engaging element 10 has a substantially semicircular end surface shape when viewed in the axial direction, and has a symmetrical shape in the width direction.

The pressing surfaces 25 are provided on an outer side surface in the radial direction of the engaging element 10 and face the pressed surface 11. In the present example, the pressing surfaces 25 are provided at two positions spaced apart in the circumferential direction on the outer side surface in the radial direction of the engaging element 10. Each pressing surface 25 is configured by a partially cylindrical convex curved surface having a smaller radius of curvature than a radius of curvature of the pressed surface 11. Note that portions of the outer side surface in the radial direction of the engaging element 10 that are separated in the circumferential direction from the two pressing surfaces 25, exist farther on the inner side in the radial direction than an imaginary circle that is centered on the central axis O of the input member 7 and connects the two pressing surfaces 25 when viewed from the axial direction. That is, in a state in which the two pressing surfaces 25 are in contact with the pressed surface 11, the portions of the outer side surface in the radial direction of the engaging element 10 that are separated in the circumferential direction from the two pressing surfaces 25 do not come in contact with the pressed surface 11.

Preferably, the pressing surface 25 respectively have a surface texture that has a larger coefficient of friction with respect to the pressed surface 11 than the other portion of the engaging element 10. In addition, the pressing surface 25 can be formed so as to be integrated with the other portion of the engaging element 10, or can be formed on the surface of a friction material fixed to the other portion of the engaging element 10 by sticking, adhesive, or the like.

The input-side engaged portion 26 is provided at an intermediate portion in the radial direction of a center portion in the width direction of the engaging element 10. The input side engaged portion 26 has a substantially arch-shaped opening shape when viewed from the axial direction, and is configured by a through hole that passes in the axial direction through the intermediate portion in the radial direction of the central portion in the width direction of the engaging element 10. The input-side engaged portion 26 has a size that allows the input-side engaging portion 12 to be loosely inserted. Therefore, in a state in which the input-side engaging portion 12 is inserted inside the input-side engaged portion 26, a gap exists between the input-side engaging portion 12 and the inner surface of the input-side engaged portion 26 in both the width direction and radial direction of the engaging element 10. Therefore, the input-side engaging portion 12 is able to displace in the rotation direction of the input member 7 relative to the engaging element 10, and the engaging element 10 is able to displace in the radial direction of the engaging element 10 with respect to the input-side engaging portion 12. In the present example, the input-side engaged portion 26, on an inner side surface in the radial direction facing outward in the radial direction, has a flat surface 28 that is parallel to a flat surface portion 29 provided on an inner side surface in the radial direction of the engaging element 10.

Note that in a case of implementing the technique according to the present disclosure, the input-side engaged portion may be configured by a bottomed hole that opens only on the one side surface in the axial direction of the engaging element. Alternatively, the input-side engaged portion may be configured by a notch that opens on the outer side surface in the radial direction of the engaging element.

The output-side engaged portion 27 is provided at a center portion in the width direction of an inner side surface in the radial direction of the engaging element 10. In the present example, the engaging element 10 has the flat surface portion 29 on the inner side surface in the radial direction, and has two protruding portions 30 protruding inward in the radial direction at two positions in the width direction of the flat surface portion 29. The output side engaged portion 27 is configured by a portion of the flat surface portion 29 that exists between the two protruding portions 30 in the width direction. The dimension in the width direction of the output-side engaged portion 27, that is, the distance between the two protruding portions 30 is larger than the dimension in the width direction of the flat surface 23 of the output-side engaging portion 19.

In the reverse input blocking clutch 4 of the present example, in a state in which the two pressing surfaces 25 of the respective engaging elements 10 are oriented toward opposite sides in the radial direction, and the inner side surfaces (flat surface portions 29) in the radial direction of the respective engaging elements 10 are aligned facing each other, the two engaging elements 10 are arranged inside the pressed member 9 in the radial direction so that each engaging element 10 can move in the radial direction (first direction). In addition, the two input-side engaging portions 12 of the input member 7 arranged on the one side in the axial direction are inserted in the axial direction into the input-side engaged portions 26 of the respective engaging elements 10, and the output-side engaging portion 19 of the output member 8 arranged on the other side in the axial direction is inserted in the axial direction between the output-side engaged portions 27 of the two engaging elements 10. That is, the two engaging elements 10 are arranged so that the output-side engaging portion 19 is sandwiched from the outer side in the radial direction between the output-side engaged portions 27 of the two engaging elements 10.

Note that in a state in which the two engaging elements 10 are arranged on the inner side in the radial direction of the pressed member 9, the inner diameter dimension of the pressed member 9 and the dimension in the radial direction of the engaging elements 10 are regulated such that a gap exists at least at one of a portion between the pressed surface 11 and each pressing surface 25 and a portion between the tip-end surfaces of the protruding portions 30.

In a case of implementing the actuator with reverse input blocking clutch according to one aspect of the present disclosure, the reverse input blocking clutch may further include a biasing member that elastically biases the engaging element in a direction that brings the pressing surface closer to the pressed surface. In the reverse input blocking clutch 4 of the present example, the biasing member may be configured, for example, by two compression coil springs located between the two combinations of the protruding portions 30 of the two engaging elements 10 and that are prevented from falling out by inserting the protruding portions 30 inside the end portions on both sides in the length direction. Alternatively, the biasing member can be configured by two leaf springs arranged between the flat surface portions 29 of the two engaging elements 10 and the output-side engaging portion 19.

Figure 5:
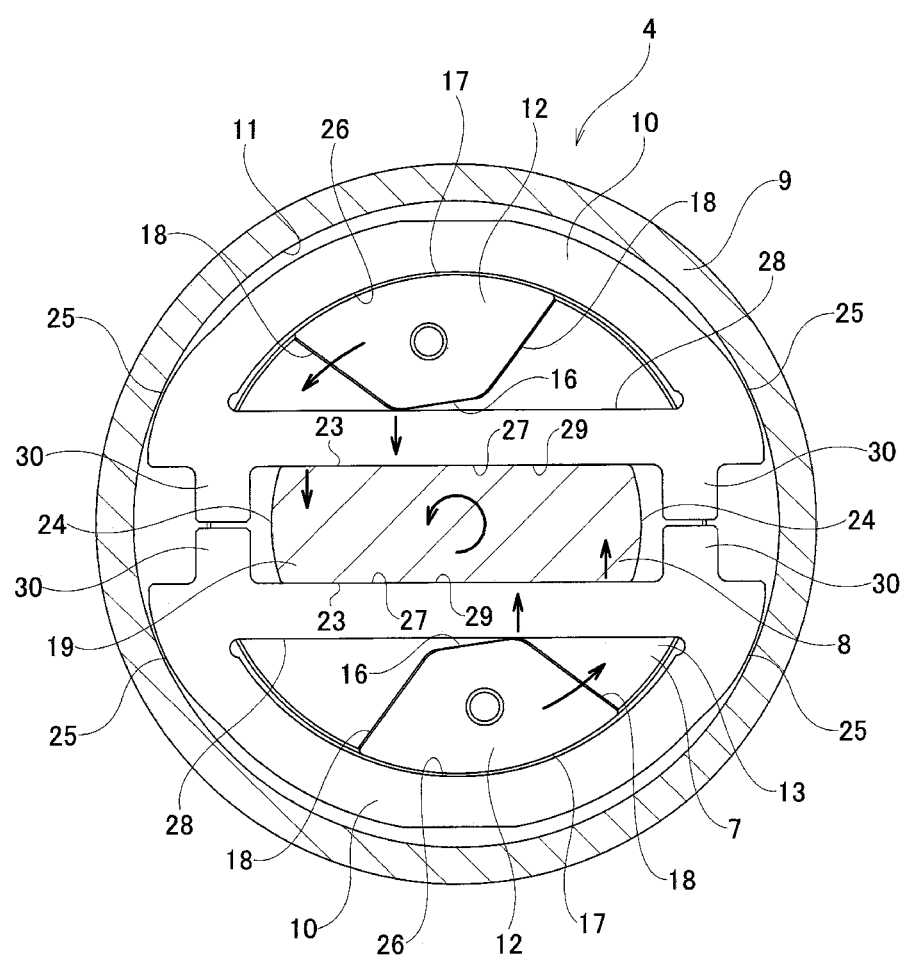
FIG. 5 is a diagram similar to FIG. 4 illustrating a state of the reverse input blocking clutch of the first example in which torque input to an input member is transmitted to an output member.

In the reverse input blocking clutch 4 of the present example, when torque is input from the actuator 5 to the input member 7 in a state in which reverse torque is not input to the output member 8 from the linear motion mechanism 3, which is the output side mechanism, as shown in FIG. 5, the input-side engaging portions 12 rotate in the rotation direction of the input member 7 (counterclockwise in the example of FIG. 5) inside the input-side engaged portions 26. Then, the inner side surfaces 16 in the radial direction of the input-side engaging portions 12 press the flat surfaces 28 of the input-side engaged portion 26 inward in the radial direction, which applies a force to the two engaging elements 10 in directions that separate the pressing surfaces 25 from the pressed surface 11 in the first direction. As a result, the engaging elements 10 move in directions in which the pressing surfaces 25 are separated from the pressed surface 11 in the first direction. That is, due to the engagement with the input member 7, the two engaging elements 10 are moved inward in the radial direction, which are directions in which the engaging elements 10 approach each other (the engaging element 10 located on the upper side of FIG. 5 is directed downward, and the engaging element 10 located on the lower side of FIG. 5 is directed upward).

As a result, the inner side surfaces in the radial direction of the two engaging elements 10 move toward each other, and the output-side engaged portions 27 of the two engaging elements 10 sandwich the output-side engaging portion 19 of the output member 8 from both sides in the radial direction. That is, while rotating the output member 8 so that the flat surfaces 23 of the output-side engaging portion 19 become parallel to the flat surface portions 29 of the engaging elements 10, the output-side engaging portion 19 engages with the output-side engaged portions 27 of the two engaging elements 10 without looseness. As a result, the output member 8 is unlocked, and torque can be transmitted between the input member 7 and the output member 8. In other words, the input member 7 and the output member 8 rotate together. In short, torque input to the input member 7 is transmitted to the output member 8 through the two engaging elements 10.

Figure 6:
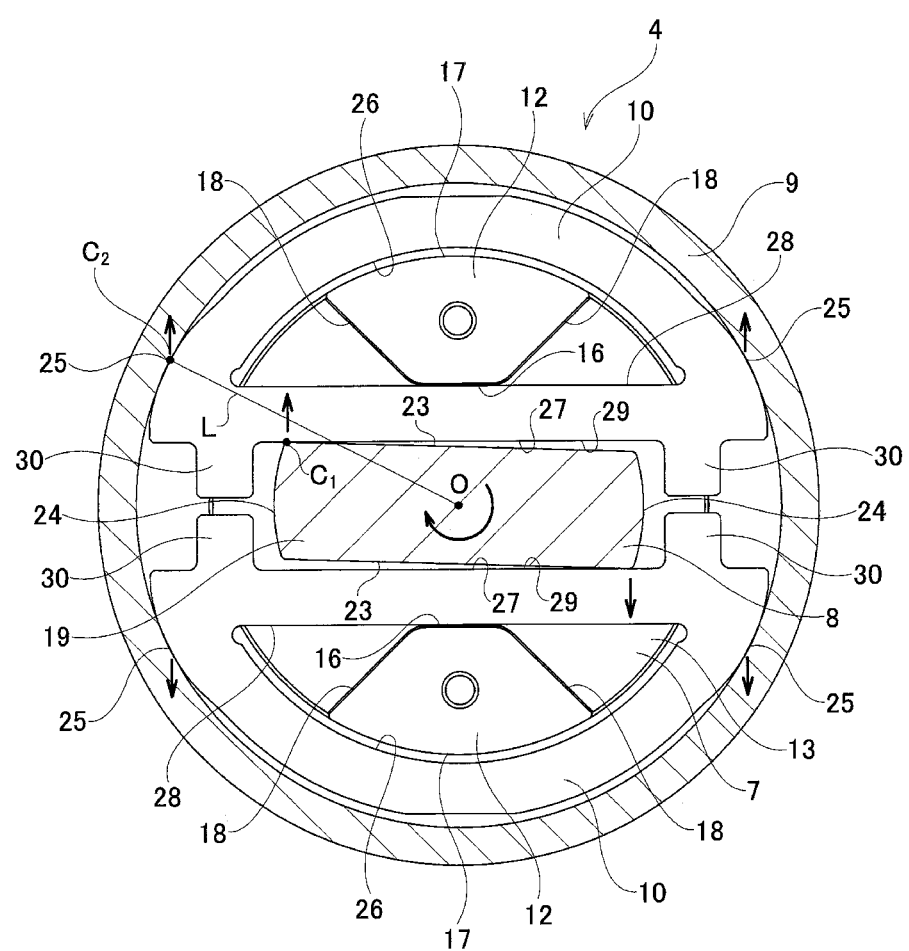
FIG. 6 is a diagram similar to FIG. 4 illustrating a state of the reverse input blocking clutch of the first example in which the output member is locked.

On the other hand, when torque is reversely input from the linear motion mechanism 3 to the output member 8 in a state in which torque is not input from the actuator 5 to the input member 7, as shown in FIG. 6, the output-side engaging portion 19 rotates in the rotation direction of the output member 8 (clockwise in the example of FIG. 6) inside the output-side engaged portions 27 of the two engaging elements 10. As a result, the corner portions of the outer peripheral surface of the output-side engaging portion 19, which are connecting portions between the flat surfaces 23 and the convex curved surfaces 24, press the output-side engaged portions 27 outward in the radial direction, which presses the two engaging elements 10 in directions approaching the pressed surface 11. That is, due to the engagement with the output member 8, the two engaging elements 10 are moved outward in radial directions, which are directions away from each other (the engaging element 10 located on the upper side of FIG. 6 is pressed upward, the engaging element 10 located on the lower side is pressed downward). As a result, the respective pressing surfaces 25 of the two engaging elements 10 are pressed against the pressed surface 11 and frictionally engaged.

As a result, the torque reversely input to the output member 8 is completely blocked and is no longer transmitted to the input member 7. That is, by sandwiching the two engaging elements 10 between the output-side engaging portion 19 and the pressed member 9 so that the two pressing surfaces 25 do not slide with respect to the pressed surface 11, the output member 8 is locked.

In the reverse input blocking clutch 4 of the present example, the size of the respective gaps between the components is adjusted so that the above operation is possible. Note that in FIG. 5 and FIG. 6, the gaps in the radial direction between the input member 7 and the output member 8 and the two engaging elements 10 are exaggeratedly illustrated.

In the present example, the reverse input blocking clutch 4 includes two engaging elements 10; however, in a case of implementing the technique according to the present disclosure, as long as the above operation can be achieved, the reverse input blocking clutch 4 includes only one engaging element, or may include three or more engaging elements.

In particular, in the reverse input blocking clutch 4 of the present example, in a positional relationship in which the two pressing surfaces 25 of each engaging element 10 are in contact with the pressed surface 11, between the inner side surfaces 16 in the radial direction of the input-side engaging portions 12 and the inner surfaces of the input-side engaged portions 26, a gap exits that allows the two pressing surfaces 25 to be further pressed against the pressed surface 11 by the corner portions of the output-side engaging portion 19 pressing the output-side engaged portions 27. Thus, when each engaging element 10 moves outward in the radial direction due to torque being reversely input to the output member 8, the movement of each engaging element 10 is prevented from being blocked by the input-side engaging portions 12, and even after the two pressing surfaces 25 come in contact with the pressed surface 11, the output member 8 is properly locked by changing the surface pressure acting on the contact portions between the two pressing surfaces 25 and the pressed surface 11 according to the magnitude of the rotational torque reversely input to the output member 8.

Furthermore, in the reverse input blocking clutch 4 of the present example, the dimensions and shapes of each portion of the pressed member 9, the input member 7, the output member 8, and the two engaging elements 10 are regulated so as to satisfy the following relationship.

First, in a state in which the two pressing surfaces 25 are pressed against the pressed surface 11 as the output member 8 rotates in a predetermined direction (for example, clockwise direction in FIG. 4), and the input-side engaging portion 12 and the input-side engaged portion 26 engage with each other as the input member 7 rotates in a direction opposite to the predetermined direction (for example, counterclockwise in FIG. 4), or in other words, in a state in which a part of the input-side engaging portion 12 is in contact with the input-side engaged portion 26, a first distance D1, which is the distance in the second direction between the contact portion $P_{in}$ between the input-side engaging portion 12 and the input-side engaged portion 26 and the rotation center O of the input member 7, is less than a second distance D2 in the second direction between the contact portion Pout between the output-side engaging portion 19 and the output-side engaged portion 27 and the rotation center O of the output member 8 ($D_1 < D_2$).

In addition, as illustrated in FIG. 6, in a locked state in which torque is reversely input to the output member 8 and the two pressing surfaces 25 of each engaging element 10 are in contact with the pressed surface 11, the contact portion $C_1$ between the output-side engaging portion 19 and the output side engaged portion 27 is located on the side closer to the rotation center O of the output member 8 in the first direction (lower side in FIG. 6) than a virtual line L connecting the contact portions $C_2$ of one pressing surface 25 of the two pressing surfaces 25, or more specifically, the pressing surface 25 on the side closer to the contact portion C1 than the rotation center O of the output member, and the rotation center O of the output member 8.

(Control Method of Reverse Input Blocking Clutch)

The actuator with reverse input blocking clutch 2 of the present example is characterized in that the reverse input blocking clutch 4 is controlled as follows. The actuator with reverse input blocking clutch 2 of the present example, in a state in which torque is reversely input from the linear motion mechanism 3, which is the output side mechanism, to the output member 8, gives torque to the input member 7 by the actuator 5 in the opposite direction (for example, counterclockwise in FIG. 7) to the direction of the torque reversely input from the linear motion mechanism 3 to the output member 8 (for example, clockwise in FIG. 7). Thus, the reverse input blocking clutch 4 is switched to a state in which torque can be transmitted between the input member 7 and the output member 8. More specifically, torque having a magnitude greater than or equal to a predetermined unlocking torque is applied by the actuator 5 to the input member 7 in a direction opposite to the direction of the torque being reversely input to the output member 8, the reverse input blocking clutch 4 is switched to a state in which torque can be transmitted between the input member 7 and the output member 8. Preferably, in the present example, torque that has a magnitude greater than or equal to the predetermined unlocking torque and less than the magnitude of the torque that is reversely input to the output member 8 is applied by the actuator 5 to the input member 7 in the opposite direction to the direction of the torque being reversely input to the output member 8.

Note that the magnitude of the unlocking torque is the minimum required magnitude of the torque of the input member 7 in order to switch the reverse input blocking clutch 4 to the unlocked state as the input member 7 rotates, or in other words, in order to separate the pressing surface 25 of the engaging element 10 from the pressed surface 11. In the reverse input blocking clutch 4 of this example, in a case where torque is reversely input from the linear motion mechanism 3 to the output member 8 when the rear wheels 31, which are steered wheels, attempt to return to a straight-ahead state from a state in which a steering angle is applied based on the restoring force due to self-aligning torque, for example, the magnitude of the unlocking torque is smaller than the magnitude of the torque that is reversely input to the output member 8 based on the self-aligning torque.

In other words, when the input member 7 is rotationally driven by the actuator 5 in a direction opposite to the direction of the torque reversely input from the linear motion mechanism 3 to the output member 8, the inner side surface 16 in the radial direction of the input-side engaging portion 12 presses the flat surface 28 of the input-side engaged portion 26 inward in the radial direction, and each of the two engaging elements 10 moves in a direction away from the pressed surface 11. As a result, the output-side engaged portions 27 of the two engaging elements 10 sandwich the output-side engaging portion 19 of the output member 8 from both sides in the radial direction, the output-side engaging portion 19 and the output-side engaged portions 27 of the two engaging elements 10 engage, and it becomes possible for torque to be transmitted between the input member 7 and the output member 8.

After the reverse input blocking clutch 4 is switched to a state where torque can be transmitted between the input member 7 and the output member 8, the actuator with reverse input blocking clutch 2 continues to give an instruction to the actuator 5 to apply torque having a magnitude less than the magnitude of the torque that is reversely input from the linear motion mechanism 3 to the output member 8, to the input member 7 in a direction opposite to the direction of the torque being reversely input to the output member 8. As a result, the torque reversely input from the linear motion mechanism 3 to the output member 8 is transmitted to the input member 7.

That is, when torque larger than the torque input to the input member 7 is input to the output member 8 in a state where the pressing surfaces 25 of the two engaging elements 10 are separated from the pressed surface 11, the input member 7 rotates as it is pushed back by the output member 8 through the two engaging elements 10. As a result, the torque reversely input from the linear motion mechanism 3 to the output member 8 is transmitted to the input member 7.

Note that after the reverse input blocking clutch 4 is switched to a state in which torque can be transmitted between the input member 7 and the output member 8, the instruction value for the magnitude of the torque applied from the actuator 5 to the input member 7 is sufficient as long as the torque can prevent the reverse input blocking clutch 4 from switching to the locked state. More specifically, the magnitude of the torque applied from the actuator 5 to the input member 7 is sufficient as long as the torque suppresses the engaging element 10 from moving in the direction in which the pressing surfaces 25 approaches the pressed surface 11 due to the action of the biasing member. Therefore, after the reverse input blocking clutch 4 has been switched to the unlocked state in which torque can be transmitted between the input member 7 and the output member 8, the instruction value for the torque applied from the actuator 5 to the input member 7 can be made much smaller than the lock release torque.

The torque transmitted to the input member 7 is absorbed by the electric motor of the actuator 5 serving as a load.

(Steering Device)

In the steering device 1 of the present example, when the rear wheels 31, which are steered wheels, attempt to return to a straight-ahead state from a state in which a steering angle is applied based on the restoring force due to self-aligning torque, the torque that is reversely input from the linear motion mechanism 3 to the output member 8 can be transmitted to the input member 7; however, conditions are set so that when an impactful torque is applied to the output member 8 from the linear motion mechanism 3 due to the rear wheels 31 running onto a curb or the like, the output member 8 is locked.

More specifically, in a case where the magnitude and increasing speed of the torque reversely input from the linear motion mechanism 3 to the output member 8 are within a predetermined range, by energizing the actuator 5 and applying torque greater than or equal to a predetermined unlocking torque to the input member 7 in a direction opposite to the direction of the torque reversely input to the output member 8, torque reversely input from the linear motion mechanism 3 to the output member 8 can be transmitted to the input member 7. After that, an instruction is continuously given to the actuator 5 to apply torque to the input member 7 that is less than the magnitude of the torque reversely input to the output member 8 from the linear motion mechanism 3 in a direction opposite to the direction of the torque that is reversely input to the output member 8. Thus, the torque reversely input to the output member 8 is transmitted to the input member 7.

On the other hand, in a case where the magnitude and/or increasing speed of the torque reversely input from the linear motion mechanism 3 to the output member 8 is excessive, by stopping power supply to the actuator 5 and not applying torque to the input member 7, the output member 8 is locked.

The magnitude and rate of change of the torque reversely input from the linear motion mechanism 3 to the output member 8 can be estimated based on the current value of the electric motor of the actuator 5. Alternatively, the magnitude and rate of change of the torque reversely input to the output member 8 may be determined based on the output signal of a torque sensor attached to the output member 8. Alternatively, the load applied to the rear wheels 31 can be calculated based on output signals from a yaw rate sensor, an acceleration sensor, or the like attached to the vehicle body, and the magnitude and rate of change of the torque reversely input to the output member 8 can be determined.

Note that in a state where torque reversely input from the linear motion mechanism 3 to the output member 8 can be transmitted to the input member 7, when a torque having a magnitude larger than the torque that is reversely input to the output 8 from the linear motion mechanism 3 is applied from by the actuator 5 to the input member 7 in the opposite direction to the direction of the torque that is being reversely input from the linear motion mechanism 3 to the output member 8, the torque input to the input member 7 can be transmitted to the output member 8. In the actuator with reverse input blocking clutch 2 of the present example, by increasing the torque input to the input member 7 from a state where the torque reversely input from the linear motion mechanism 3 to the output member 8 is transmitted to the input member 7, even in a case where the direction of torque transmission within the reverse input blocking clutch 4 is reversed, the engaging elements 10 do not move in the radial direction, and the pressing surface 25 and the pressed surface 11 do not come into contact with each other. That is, changing the direction of torque transmission within the reverse input blocking clutch 4 can be performed smoothly.

The linear motion mechanism 3 of the present example has a rod 32 and converts rotational movement of the output member 8 into axial movement of the rod 32. The rod 32 is supported so that it can linearly move in the axial direction of the rod 32, and the rod 32 is connected to the rear wheels 31, which are steered wheels, so that the direction of the rear wheels 31 changes in accordance with the axial movement. The linear motion mechanism 3 of the present example further includes a ball nut 33 and a plurality of balls 34. That is, the linear motion mechanism 3 of the present example is configured by a ball-type feed screw mechanism.

The rod 32 has a spiral male ball screw groove on an outer peripheral surface thereof. The rod 32 is supported so that the axial direction thereof faces the width direction of the vehicle body, allowing linear movement in the axial direction, and the rod 32 is unable to rotate.

The rod 32 is connected to the rear wheels 31 so that the direction of the rear wheels 31 changes according to the linear movement thereof in the axial direction. That is, base-end portions of tie rods 35 are connected to end portions on both sides in the axial direction of the rod 32 through spherical joints (not illustrated). A base end portion of a knuckle arm 36 is pivotally supported at a tip-end portion of each tie rod 35. A knuckle is supported at the tip-end portion of each knuckle arm 36 so as to pivot around a king pin. Each rear wheel 31 is rotatably supported on a knuckle through a hub unit bearing.

The ball nut 33 has a spiral female ball screw groove on an inner peripheral surface thereof, and is supported around the rod 32 so as to be only rotatable. The ball nut 33 is rotatably driven by the output member 8 of the actuator with reverse input blocking clutch 2.

In the present example, the ball nut 33 is rotatably driven by the output member 8 through a torque transmission mechanism 37. That is, the steering device 1 of the present example includes a torque transmission mechanism 37 that transmits the rotational movement or torque of the output member 8 of the actuator with reverse input blocking clutch 2, to the ball nut 33 that is a torque input portion of the linear motion mechanism 3.

The torque transmission mechanism 37 includes a driving gear 38 externally fitted and fixed to the output shank portion 22 of the output member 8, an intermediate gear 39 that engages with the driving gear 38, and a driven gear 40 that is provided around the ball nut 33 and engages with the intermediate gear 39. That is, in the present example, the torque transmission mechanism 37 is configured by a gear type speed reducer.

Note that, in a case of implementing the technique according to present disclosure, the driving gear provided on the output member of the actuator with reverse input blocking clutch may be directly engaged with a driven gear provided on the ball nut that is the torque input portion of the linear motion mechanism, and it is also possible to provide two or more intermediate gears. Alternatively, the torque transmission mechanism for transmitting the rotational motion of the output member to the ball nut may be configured by a speed reducer using a belt or chain, or may be configured by a worm speed reducer.

The plurality of balls 34 are rotatably arranged in a load path formed by a male ball screw groove of the rod 32 and a female ball screw groove of the ball nut 33.

Note that the starting point and the ending point of the load path are connected by a circulation path provided on an inner peripheral surface of the ball nut 33 or provided in a circulation component fixed to the ball nut 33.

When the steering device 1 of the present example applies a steering angle to the two rear wheels 31, the rotation amount and rotation speed of the steering wheel of the steering device (not illustrated), the vehicle speed and/or the surrounding situation are measured using sensors, and based on the information from the sensors, an ECU (not illustrated) controls an amount and direction of energization to the actuator 5. As a result, when the input member 7 is driven to rotate, as illustrated in FIG. 5, the reverse input blocking clutch 4 is unlocked and the rotation of the input member 7 is transmitted to the output member 8.

The rotation of the output member 8 is transmitted to the ball nut 33 by the torque transmission mechanism 37, and by the rod 32 moving in the axial direction with the rotation of the ball nut 33, the tie rods 35 are pushed and pulled, applying a steering angle to the rear wheels 31.

Figure 7:
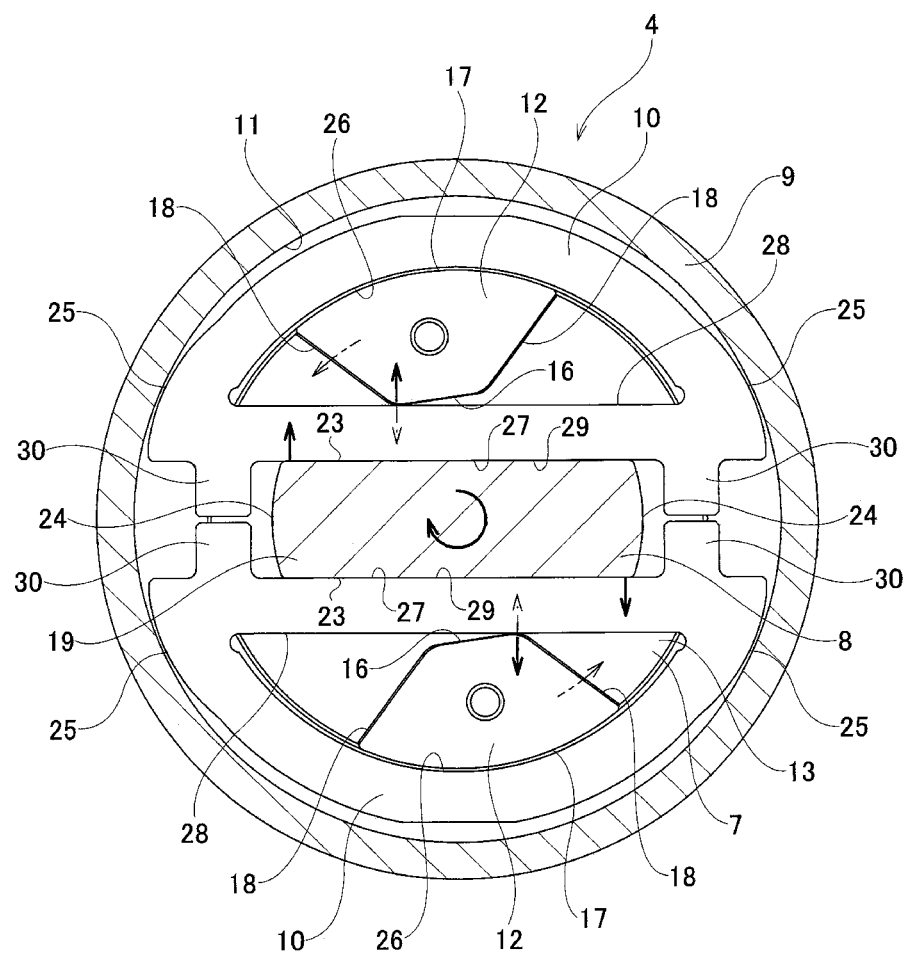
FIG. 7 is a diagram similar to FIG. 4 illustrating a state of the reverse input blocking clutch of the first example in which torque reversely input to the output member is transmitted to the input member.

When returning the rear wheels 31 from the state in which the steering angle is applied to the straight-ahead state, due to the restoring force by the self-aligning torque, the actuator 5 applies torque to the input member 7 in a direction opposite to the direction of the torque reversely input to the output member 8 in order to transmit the torque reversely input from the linear motion mechanism 3 to the output member 8 through the torque transmission mechanism 37 to the input member 7. More specifically, the actuator 5 applies a torque greater than or equal to a predetermined unlocking torque to the input member 7 in a direction opposite to the direction of the torque reversely input to the output member 8. After that, an instruction is continuously given to the actuator 5 to apply torque having a magnitude less than the magnitude of the torque reversely input to the output member 8 to the input member 7 in a direction opposite to the direction of the torque reversely input to the output member 8. Thus, as illustrated in FIG. 7, the reverse input blocking clutch 4 is brought into a state in which the reverse input torque from the linear motion mechanism 3 to the output member 8 through the torque transmission mechanism 37 can be transmitted to the input member 7 due to the restoring force of the self-aligning torque, and by allowing the output member 8 to rotate, the rod 32 is allowed to move in the axial direction. As a result, the rear wheels 31 can be returned to the straight-ahead state due to the restoring force of the self-aligning torque.

Note that while the rear wheels 31 return to the straight-ahead state due to the restoring force of the self-aligning torque from the state in which the rear wheels 31 are given a steering angle in a predetermined direction, when the magnitude of the torque applied to the input member 7 is made larger than the torque reversely input to the output member 8, a steering angle in a predetermined direction can be applied to the rear wheels 31 again.

On the other hand, when the rear wheels 31 run onto a curb or the like and an impact load is applied to the rear wheels 31, and an impact torque is applied from the linear motion mechanism 3 to the output member 8 through the torque transmission mechanism 37, in order to block the torque reversely input to the output member 8 and prevent the torque from being transmitted to the input member 7, the power supply to the actuator 5 is stopped so that torque is not applied to the input member 7. Thus, as illustrated in FIG. 6, by locking the output member 8, movement in the axial direction of the rod 32 is prevented. As a result, even in a case where an impact load is applied to the rear wheels 31, the steering angle can be prevented from being applied to the rear wheels 31, and the behavior of the vehicle can be prevented from becoming unstable.

In the steering device 1 of the present example, the linear motion mechanism 3 that converts the rotational motion of the electric motor of the actuator 5 into the linear motion of the rod 32 is configured by a ball screw mechanism. The ball screw mechanism can achieve higher efficiency than a sliding screw mechanism in which a female thread groove provided on the inner peripheral surface of the nut and a male thread groove provided on the outer peripheral surface of the rod are brought into sliding contact. Therefore, with the steering device 1 of the present example, the size of the electric motor of the actuator 5 may be reduced.

In addition, the steering device 1 of the present example includes an actuator 2 with a reverse input blocking clutch that has a function of blocking torque reversely input to the output member 8 and not transmitting torque to the input member 7. Therefore, even in a case where a ball screw mechanism is used as the linear motion mechanism 3, it is possible to prevent a steering angle from being inadvertently applied to the rear wheels 31 due to an impactful load being applied to the rear wheels 31.

On the other hand, in the actuator with reverse input blocking clutch 2 of the present example, in a case where it is desired that the torque reversely input to the output member 8 from the linear motion mechanism 3 through the torque transmission mechanism 37 be transmitted to the input member 7, the actuator 5 applies torque to the input member 7 in a direction opposite to the direction of the torque input from the linear motion mechanism 3 to the output member 8. Thus, a force directed inward in the radial direction, which is a direction that separates each pressing surface 25 from the pressed surface 11, is applied to the engaging element 10, which moves the engaging element 10 inward in the radial direction. By separating each pressing surface 25 from the pressed surface 11, the torque reversely input to the output member 8 can be transmitted to the input member 7. After that, by continuing to give an instruction to the actuator 5 to apply torque to the input member 7 having a magnitude less than the magnitude of the torque reversely input to the output member 8 from the linear motion mechanism 3 in the opposite direction to the direction of the torque reversely input to the output member 8, the torque reversely input to the output member 8 from the linear motion mechanism 3 is transmitted to the input member 7.

Therefore, it is possible to prevent the occurrence of a jerking phenomenon in which the input member and the output member intermittently rotate in a predetermined direction, while repeatedly alternating in a short period of time between a state in which the input member and output member can rotate in a predetermined direction and a state in which the input member and output member cannot rotate, as in a case when trying to unlock the reverse input blocking clutch in a state where reverse torque is input to the output member in a predetermined direction by inputting torque to the input member in the same direction as the direction of the torque reversely input to the output member, and it is possible to prevent the rotation of the input member and the output member from becoming jerky.

More specifically, in the steering device 1 of the present example, the rear wheels 31 can be smoothly returned to the straight-ahead state from the state where a steering angle is applied, and thus it is possible to prevent passengers including the driver from feeling uncomfortable.

Note that even when the torque accompanying the return of the rear wheels 31 to the straight-ahead state is reversely input to the output member 8 due to the restoring force of the self-aligning torque, it is also possible to apply torque in the same direction as the reversely input torque to the output member 8 based on an instruction from the ECU.

In the reverse input blocking clutch 4 of the present example, the first distance $D_1$ is made smaller than the second distance $D_2$, and in the locked state, the contact portion $C_1$ is located closer to the rotation center O of the output member 8 in the first direction than the virtual straight line L. Therefore, it is possible to smoothly switch from the locked state to the unlocked state. The reason for this will be explained with reference to FIG. 8A to FIG. 8C.

When the reverse input blocking clutch 4 is in the locked state and torque is input to the input member 7, each engaging element 10 tends to rotate around the contact portion $C_1$.

Figure 8A:
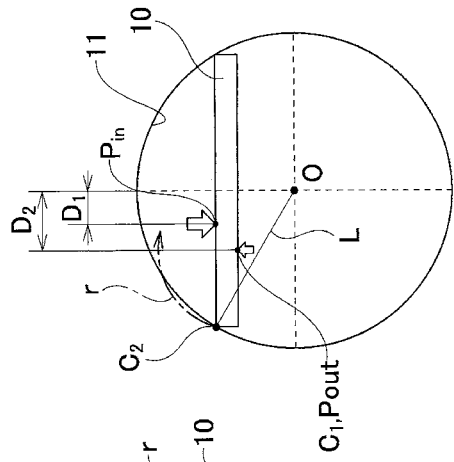
FIG. 8A to FIG. 8C are schematic diagrams for describing an effect of restricting the shape of the reverse input blocking clutch in the reverse input blocking clutch of the first example.
Figure 8B:
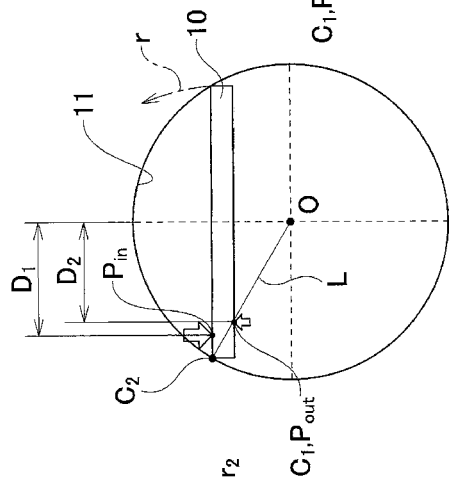

In a case where the first distance $D_1$ is larger than the second distance $D_2$ ($D_1 > D_2$), as illustrated in FIG. 8B, when torque in the counterclockwise direction is input to the input member 7, the engaging element 10 tends to rotate counterclockwise around the contact point $C_1$. As illustrated by the trajectory r shown by the dashed line in FIG. 8B, of the two pressing surfaces 25, the pressing surface 25 located on the opposite side of the contact portion $C_1$ (on the right side in FIG. 8B) across the rotation center O of the output member 8 in the second direction tends to be strongly pressed against and bite into the pressed surface 11. When switching from the locked state to the unlocked state in order to release the pressing surface 25 from biting into the pressed surface 11, the torque of the input member 7 momentarily increases, that is, a peak torque is generated.

Figure 8C:
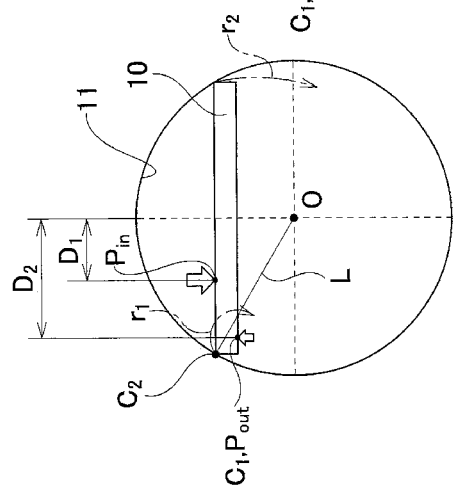

In addition, in a case where the contact portion $C_1$ is located on a side farther from the rotation center O of the output member 8 in the first direction than the virtual straight line L, as shown in FIG. 8C, when a rotational torque in the counterclockwise direction is input to the input member 7, the engaging element 10 tends to rotate clockwise around the contact portion $C_1$. As illustrated by the trajectory r shown by the dashed line in FIG. 8C, of the two pressing surfaces 25, the pressing surface 25 located closer to the contact portion $C_1$ than the rotation center O of the output member 8 in the second direction (left side in FIG. 8C) tends to be strongly pressed against and bite into the pressed surface 11. When switching from the locked state to the unlocked state, in order to release the pressing surface 25 from biting into the pressed surface 11, the torque of the input member 7 increases instantaneously.

On the other hand, as in the reverse input blocking clutch 4 of the present example, where the first distance $D_1$ is smaller than the second distance $D_2$ ($D_1<D_2$), and the contact portion $C_1$ is located on a side closer to the rotation center O of the output member 8 in the first direction than the virtual straight line L, as illustrated in FIG. 8A, when a rotational torque is input in the counterclockwise direction to the input member 7, the engaging element 10 tends to rotate clockwise around the contact portion $C_1$. However, as illustrated by the trajectories $r_1$ and $r_2$ with dashed lines in FIG. 8A, neither of the two pressing surfaces 25 is pressed against the pressed surface 11. Therefore, even when switching from the locked state to the unlocked state, the torque of the input member 7 does not increase instantaneously, and the switching from the locked state to the unlocked state can be performed smoothly. In addition, since no peak torque is generated, there is no need to unnecessarily increase the maximum output torque of the actuator 5, and it is possible to prevent the actuator 5 from becoming unnecessarily large.

Moreover, the reverse input blocking clutch may include an elastic member that elastically biases the engaging element in a direction that brings the pressing surface closer to the pressed surface. The elastic member can be configured by, for example, a torsion coil spring or a leaf spring. In a case where the two engaging elements are provided and the elastic member is configured by a torsion coil spring, the torsion coil spring can be held by inserting a protruding portion (the protruding portion 30 illustrated in FIG. 2, FIG. 4, and FIG. 7 in the present example) provided on the engaging element into the end portion of the torsion coil spring.

The materials of the input member, the output member, the pressed member, and the engaging element of the reverse input blocking clutch are not particularly limited. For example, these materials may include metals such as iron alloys, copper alloys, and aluminum alloys, as well as synthetic resins mixed with reinforcing fibers as necessary. In addition, the input member, the output member, the pressed member, and the engaging element may each be made of the same material or may be made of different materials.

Second Example

A second example of an embodiment according to the present disclosure will be described with reference to FIG. 9 to FIG. 13B.

In the present example, the dimensions and shapes of the pressed member 9, the input member 7a, the output member 8a, and the two engaging elements 10 of the reverse input blocking clutch 4a are changed from those of the reverse input blocking clutch 4 of the first example.

First, in a state in which the two pressing surfaces 25 are pressed against the pressed surface 11 as the output member 8a rotates in a predetermined direction (for example, clockwise direction in FIG. 9), and the input-side engaging portion 12a and the input-side engaged portion 26 engage with each other as the input member 7a rotates in a direction opposite to the predetermined direction (for example, counterclockwise in FIG. 9), or in other words, in a state in which a part of the input-side engaging portion 12a is in contact with the input-side engaged portion 26, a first distance $D_1$, which is the distance in the second direction between the contact portions $P_{in}$ between the input-side engaging portion 12a and the input-side engaged portion 26 and the rotation center O of the input member 7, is greater than a second distance $D_2$ in the second direction between the contact portions Pout between the output-side engaging portion 19a and the output-side engaged portion 27 and the rotation center O of the output member 8 ($D_1>D_2$).

Figure 9:
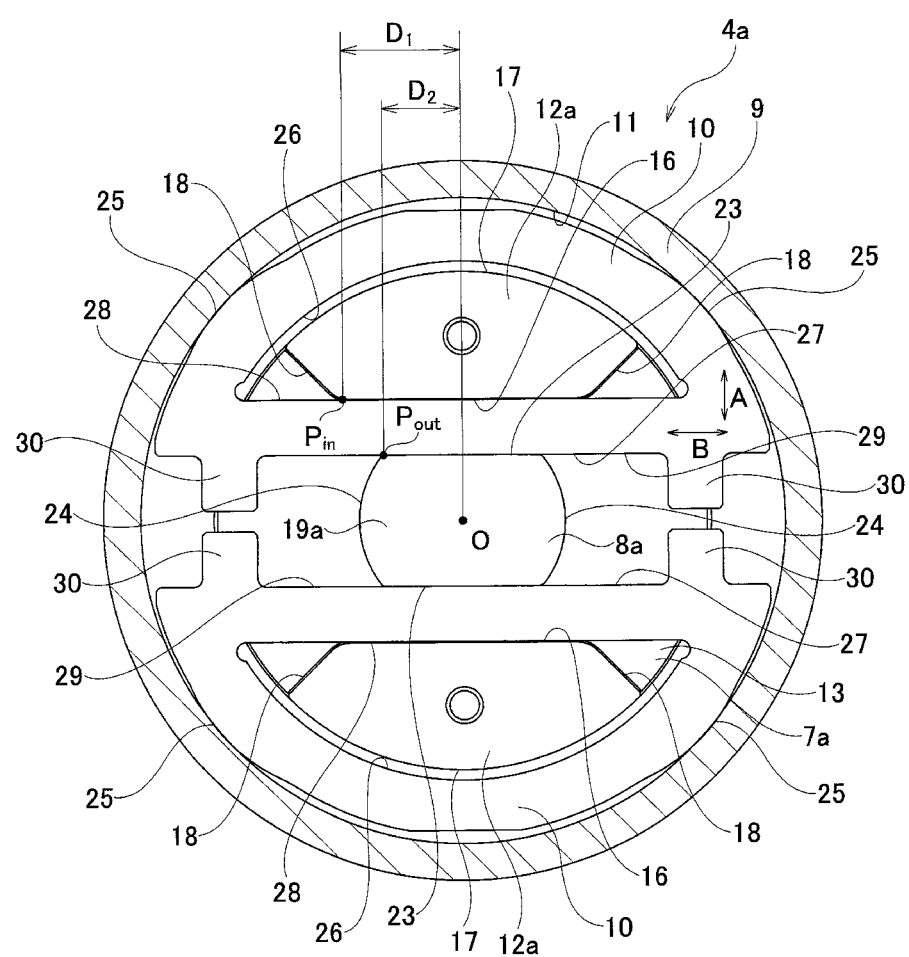
FIG. 9 is a diagram similar to FIG. 4 illustrating a reverse input blocking clutch of a second example of an embodiment according to the present disclosure.
Figure 10:
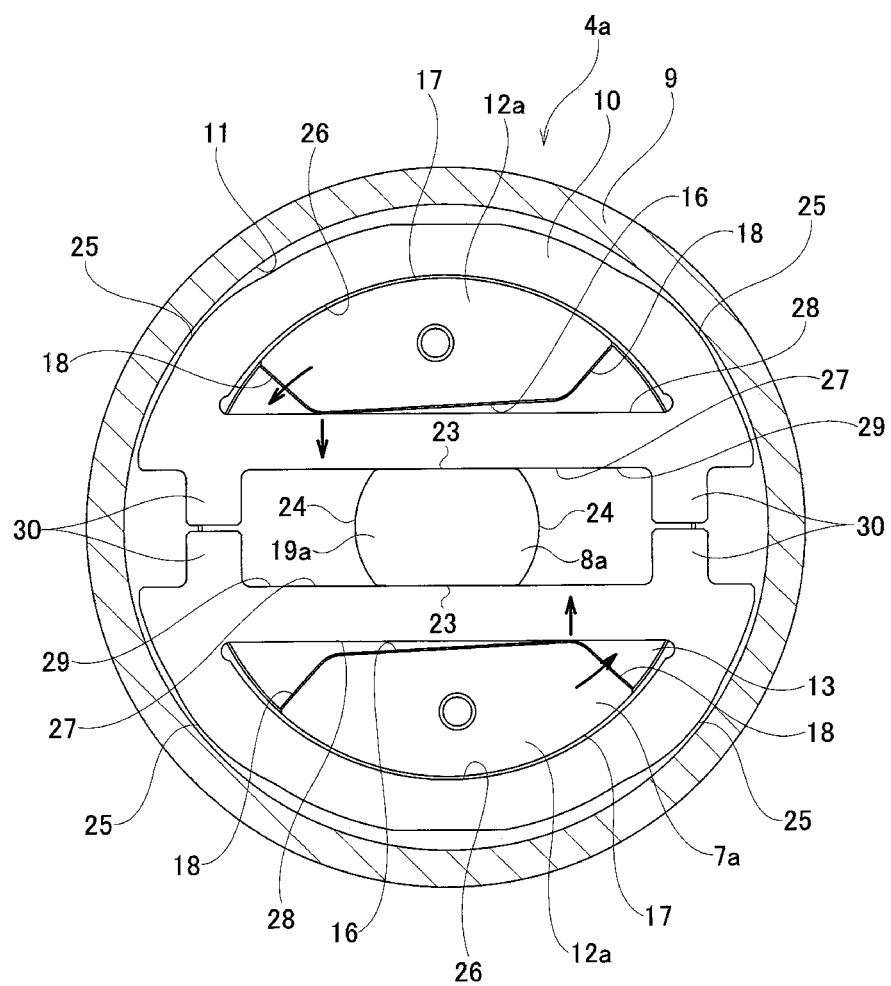
FIG. 10 is diagram similar to FIG. 5 illustrating the reverse input blocking clutch of the second example.
Figure 11:
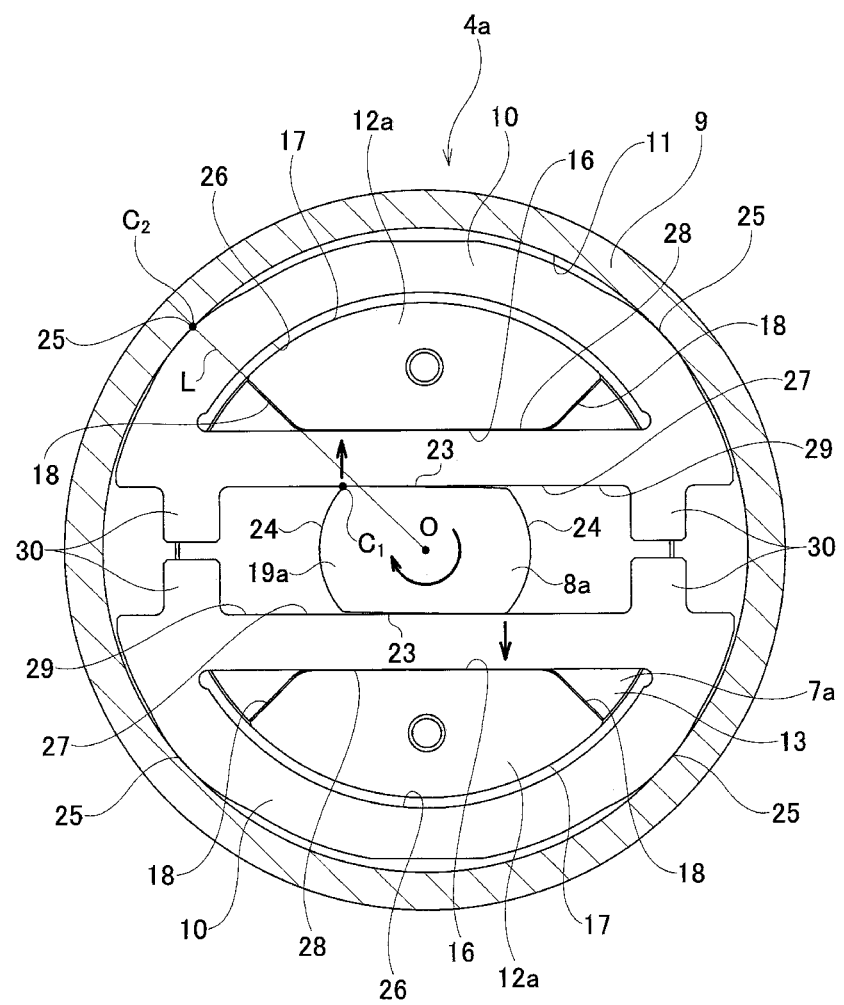
FIG. 11 is diagram similar to FIG. 6 illustrating the reverse input blocking clutch of the second example.
Figure 12:
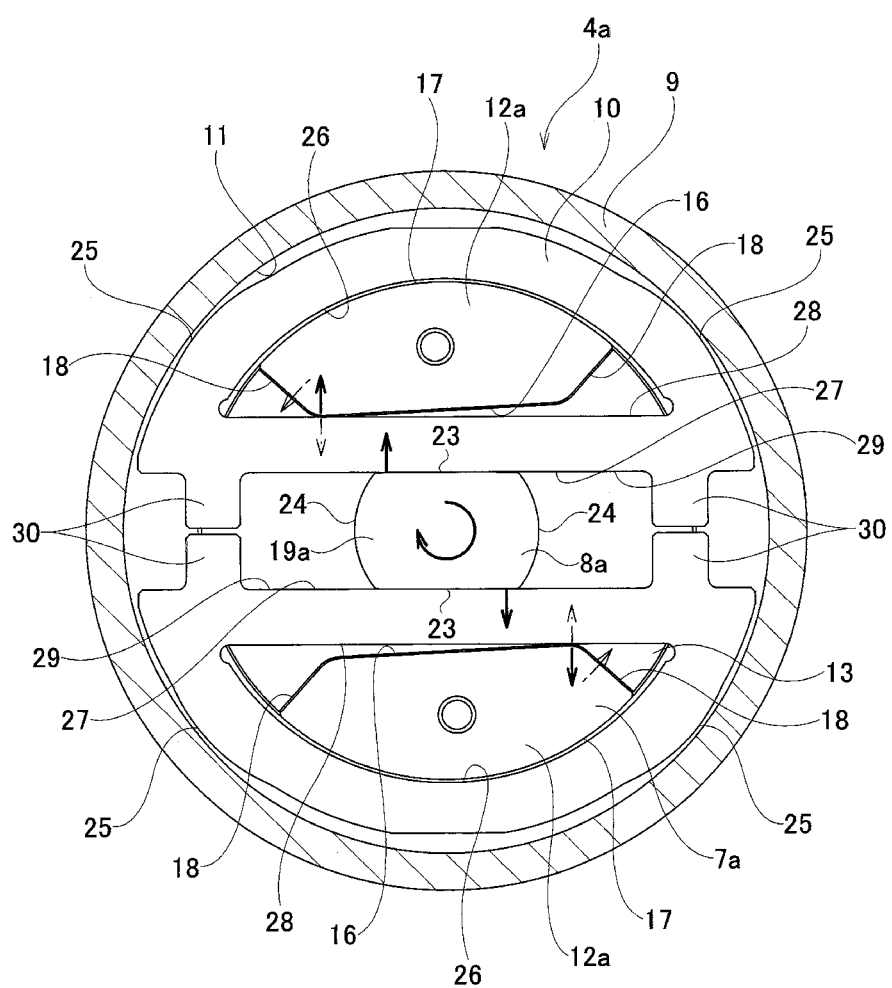
FIG. 12 is diagram similar to FIG. 7 illustrating the reverse input blocking clutch of the second example.

In addition, as illustrated in FIG. 11, in a locked state in which torque is reversely input to the output member 8a and the two pressing surfaces 25 of each engaging element 10 are in contact with the pressed surface 11, the contact portion $C_1$ between the output-side engaging portion 19a and the output side engaged portion 27 are located on the side closer to the rotation center O of the output member 8a in the first direction than a virtual line L connecting the contact point $C_2$ between the pressing surface 25 of the two pressing surfaces 25 and the pressed surface 11, or more specifically, between the pressing surface 25 on the side closer to the contact portion $C_1$ in the second direction than the rotation center O of the output member 8a and the pressed surface 11, and the rotation center O of the output member 8 (lower side in FIG. 9).

In the present example as well, in a state in which torque is being input reversely to the output member 8a, by applying torque to the input member 7a in a direction opposite to the direction of the torque being reversely input to the output member 8a, the reverse input blocking clutch 4a can be switched to a state in which torque can be transmitted between the input member 7a and the output member 8a. More specifically, by applying torque greater than or equal to the predetermined unlocking torque to the input member 7a in a direction opposite to the direction of the torque being reversely input to the output member 8a, the reverse input blocking clutch 4a is switched to a state in which the torque reversely input to the output member 8a can be transmitted to the input member 7a.

After switching the reverse input blocking clutch 4a to a state in which torque can be transmitted between the input member 7a and the output member 8a, by continuing to give an instruction to apply torque having a magnitude smaller than the magnitude of the torque being reversely input to the output member 8a to the input member 7a in a direction opposite to the direction of the torque being reversely input to the output member 8a, the torque reversely input to the output member 8a can be transmitted to the input member 7a.

In this example as well, after switching the reverse input blocking clutch 4a to a state in which torque can be transmitted between the input member 7a and the output member 8a, the instruction value of the magnitude of the torque applied to the input member 7a is sufficient as long as the torque can prevent the reverse input blocking clutch 4a from switching to the locked state. In other words, after the reverse input blocking clutch 4 has been switched to the unlocked state in which torque can be transmitted between the input member 7a and the output member 8a, the instruction value for the torque applied to the input member 7a can be made much smaller than the lock release torque.

In the reverse input blocking clutch 4a of the present example, the first distance $D_1$ is made larger than the second distance $D_2$, and in the locked state, the contact portion $C_1$ is located on the side closer to the rotation center O of the output member 8a in the first direction than the virtual straight line L. Therefore, switching from the locked state to the unlocked state may be performed smoothly, and switching from the unlocked state to the locked state may be performed quickly. The reason for this will be explained with reference to FIG. 13A and FIG. 13B.

When torque is input to the input member 7a in a locked state of the reverse input blocking clutch 4a, each of the engaging element 10 tends to rotate around the contact portion $C_1$.

Figure 13A:
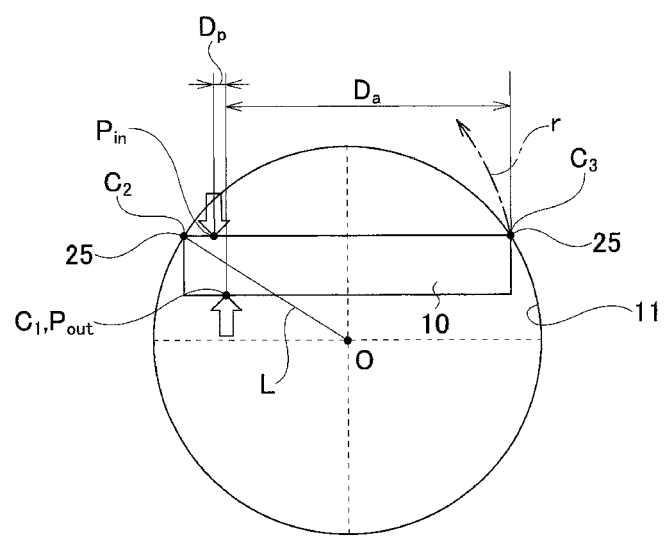
FIG. 13A and FIG. 13B are schematic diagrams for describing an effect of restricting the shape of the reverse input blocking clutch in the reverse input blocking clutch of the second example.
Figure 13B:
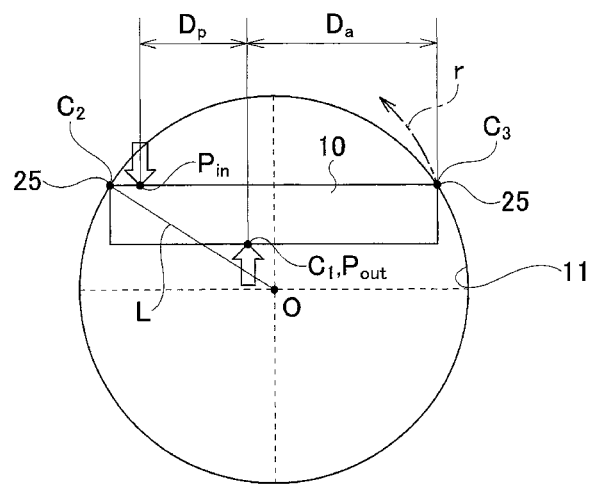

In a case where the contact portion $C_1$ is located on a side farther from the rotation center O of the output member 8a in the first direction than the virtual straight line L, as shown in FIG. 13B, when a rotational torque in the counterclockwise direction is input to the input member 7a, the engaging element 10 tends to rotate counterclockwise around the contact portion $C_1$. As illustrated by the trajectory r shown by the dashed line in FIG. 13B, of the two pressing surfaces 25, the other pressing surface 25 located on the opposite side of the contact portion $C_1$ (on the right side in FIG. 13B) across the rotation center O of the output member 8a in the second direction tends to be strongly pressed against the pressed surface 11.

That is, in a case where the contact portion $C_1$ is located on the side farther from the rotation center O of the output member 8a in the first direction than the virtual straight line L, the distance (force point distance) $D_p$ in the second direction between the contact portion $C_1$ serving as a fulcrum and a contact portion $P_{in}$ serving as a point of force becomes relatively large. On the other hand, the distance (action point distance) Da in the second direction between the contact portion $C_1$ and the contact portion $C_3$ between the pressed surface 11 and the other pressing surface 25, serving as a point of action, becomes relatively small. Therefore, due to the principle of leverage, the force pressing the other pressing surface 25 against the pressed surface 11 increases, and the other pressing surface 25 tends to bite into the pressed surface 11. In order to release the other pressing surface 25 from biting into the pressed surface 11, the rotational torque of the input member 7a is instantaneously increased and becomes excessive when switching from the locked state or semi-locked state to the unlocked state or semi-unlocked state. That is, the instantaneous maximum torque (peak torque) of the input side mechanism for rotationally driving the input member 7a becomes excessive.

On the other hand, even in a case where the contact portion $C_1$ is located on the side closer to the rotation center O of the output member 8a in the first direction than the virtual straight line L, as in the reverse input blocking clutch 4a of the present example, as illustrated in FIG. 13A, when a rotational torque in the counterclockwise direction is input to the input member 7a, the engaging element 10 tends to rotate counterclockwise around the contact portion $C_1$. As illustrated by the trajectory r shown by the dashed line in FIG. 13A, of the two pressing surfaces 25, the other pressing surface 25 located on the opposite side of the contact portion $C_1$ (on the right side in FIG. 13A) across the rotation center O of the output member 8a in the second direction tends to be pressed against the pressed surface 11.

In the present example, the contact portion $C_1$ is located on the side closer to the rotation center O of the output member 8a in the first direction than the virtual straight line L, and thus the distance (force point distance) $D_p$ in the second direction between the contact portion $C_1$ serving as a fulcrum and the contact portion $P_{in}$ serving as a point of force can be made smaller compared to the structure illustrated in FIG. 13B. In addition, the distance (action point distance) Da in the second direction between the contact portion $C_1$ and the contact portion $C_3$ between the pressed surface 11 and the other pressing surface 25, serving as a point of action, can be made larger compared to the structure illustrated in FIG. 13B. Therefore, the force that presses the other pressing surface 25 against the pressed surface 11 becomes smaller compared to the structure illustrated in FIG. 13B, and it becomes difficult for the other pressing surface 25 to bite into the pressed surface 11. Therefore, the peak torque when switching from the locked state to the unlocked state can be kept smaller than the structure illustrated in FIG. 13B. Therefore, in the reverse input blocking clutch 4a of the present example, switching from the locked state to the unlocked state can be performed smoothly.

In the reverse input blocking clutch 4a of the present example, when torque is input to the input member 7a, the engaging element 10 tends to rotate around the contact portion $C_1$, and the other pressing surface 25 tends to be pressed against the pressed surface 11. Therefore, in the reverse input blocking clutch 4a of the present example, in a case where torque is reversely input to the output member 8a, the amount of movement of the engaging element 10 in the first direction necessary to press the pressing surface 25 against the pressed surface 11 can be made smaller than in the reverse input blocking clutch 4 of the first example. Therefore, in the reverse input blocking clutch 4a of the present example, switching from the unlocked state to the locked state can be performed quickly.

In the reverse input blocking clutch 4a of the present example as well, in a case where it is desired to transmit the torque reversely input to the output member 8a to the input member 7a, by applying a torque to the input member 7a in a direction opposite to the direction of the torque reversely input to the output member 8a, the reverse input blocking clutch 4a is switched to a state in which the torque reversely input to the output member 8a can be transmitted to the input member 7a. By continuing to give an instruction to apply torque that is smaller in magnitude than the torque that is reversely input to the output member 8a to the input member 7a in a direction opposite to the direction of the torque that is reversely input to the output member 8a, the torque reversely input to the output member 8a is transmitted to the input member 7a. Therefore, even in the reverse input blocking clutch 4a in which switching from the unlocked state to the locked state can be performed quickly, the jerking phenomenon can be prevented from occurring.

The other configurations and effects of the second example are the same as those of the first example.

REFERENCE SIGNS LIST

1 Steering device
2 Actuator with reverse input blocking clutch
3 Linear motion mechanism
4, 4a Reverse input blocking clutch
5 Actuator
7, 7a Input member
8, 8a Output member
9 Pressed member
10 Engaging element
11 Pressed surface
12, 12a Input-side engaging portion 13 Base plate portion
14 Input shaft portion
15 Input shank portion
16 Inner side surface in radial direction
17 Outer side surface in radial direction
18 Side surface in circumferential direction
19, 19a Output-side engaging portion
20 Output shaft portion
21 Flange portion
22 Output shank portion
23 Flat surface
24 Convex curved surface
25 Pressing surface
26 Input-side engaged portion
27 Output-side engaged portion
28 Flat surface
29 Flat surface portion
30 Protruding portion
31 Rear wheel
32 Rod
33 Ball nut
34 Ball
35 Tie rod
36 Knuckle arm
37 Torque transmission mechanism
38 Drive gear
39 Intermediate gear
40 Driven gear

The invention claimed is:

1. An actuator with reverse input blocking clutch, comprising:
an actuator; and
a reverse input blocking clutch including an input member rotatably driven by the actuator, and an output member connected to an output-side mechanism so as to transmit torque, and when torque is input to the input member from the actuator in a state in which torque is not reversely input to the output member from the output-side mechanism, transmitting the torque input to the input member to the output member; and when torque is reversely input to the output member from the output-side mechanism in a state in which torque is not input to the input member from the actuator, locking rotation of the output member;
the actuator with reverse input blocking clutch having a function of switching the reverse input blocking clutch to a state in which torque can be transmitted between the input member and the output member, in a state in which torque is being reversely input to the output member from the output-side mechanism, by the actuator applying torque to the input member in an opposite direction to a direction of the torque that is reversely input to the output member from the output side mechanism, and then continuously giving an instruction to the actuator to apply torque having a magnitude smaller than a magnitude of the torque being reversely input to the output member from the output side mechanism to the input member in the opposite direction, transmitting the torque being reversely input to the output member from the output side mechanism to the input member.

2. The actuator with reverse input blocking clutch according to claim 1,
wherein the actuator comprises an electric motor.

3. The actuator with reverse input blocking clutch according to claim 1, wherein
the reverse input blocking clutch comprises:
a pressed member having a pressed surface on an inner peripheral surface thereof;
the input member having an input-side engaging portion arranged on an inner side in a radial direction of the pressed surface, and rotatably supported coaxially with the pressed surface;
an output member having an output-side engaging portion arranged farther on the inner side in the radial direction than the input-side engaging portion on the inner side in the radial direction of the pressed surface, and rotatably supported coaxially with the pressed surface; and
an engaging element having a pressing surface that faces the pressed surface, an input-side engaged portion capable of engaging with the input-side engaging portion, and an output-side engaged portion capable of engaging with the output-side engaging portion; the engaging element being arranged so as to move in a first direction that is a direction in which the pressing surface separates from or approaches the pressed surface; wherein
the engaging element, when torque is input from the actuator to the input member, moves in a direction in which the pressing surface is separated from the pressed surface in the first direction due to engagement between the input-side engaging portion and the input-side engaged portion, allowing torque transmission between the input member and the output member, whereas, when torque is reversely input to the output member from the output-side mechanism in a state in which torque is not being input to the input member from the actuator to the input member, the engaging element is pressed in a direction that brings the pressing surface closer to the pressed surface in the first direction, causing the pressing surface to frictionally engage with the pressed surface.

4. The actuator with reverse input blocking clutch according to claim 3, wherein the engaging element has two pressing surfaces respectively configured by the pressing surface at two positions spaced apart in a circumferential direction on an outer side surface in the radial direction.

5. The actuator with reverse input blocking clutch according to claim 4, wherein
in a state in which, as the output member rotates to one side in the circumferential direction, the two pressing surfaces are pressed against the pressed surface, and as the input member rotates to the other side in the circumferential direction, the input-side engaging portion engages with the input-side engaged portion, a distance in a second direction perpendicular to both the first direction and a rotation center of the input member between a contact portion between the input-side engaging portion and the input-side engaged portion and the rotation center of the input member is smaller than a distance in the second direction between a contact portion between the output-side engaging portion and the output-side engaged portion and a rotation center of the output member; and
in a state in which torque is reversely input to the output member and the two pressing surfaces are in contact with the pressed surface, the contact portion between the output-side engaging portion and the output-side engaged portion is located on a side closer to the rotation center of the output member in the first direction than an imaginary line connecting a contact portion between one pressing surface of the two pressing surfaces and the pressed surface and the rotation center of the output member.

6. The actuator with reverse input blocking clutch according to claim 4, wherein
in a state in which, as the output member rotates to one side in a circumferential direction, the two pressing surfaces are pressed against the pressed surface, and as the input member rotates to the other side in the circumferential direction, the input-side engaging portion engages with the input-side engaged portion, a distance in a second direction perpendicular to both the first direction and a rotation center of the input member between a contact portion between the input-side engaging portion and the input-side engaged portion and the rotation center of the input member is larger than a distance in the second direction between a contact portion between the output-side engaging portion and the output-side engaged portion and the rotation center of the output member; and
in a state in which torque is reversely input to the output member and the two pressing surfaces are in contact with the pressed surface, the contact portion between the output-side engaging portion and the output-side engaged portion is located on a side closer to the rotation center of the output member in the first direction than an imaginary line connecting a contact portion between one pressing surface of the two pressing surfaces and the pressed surface and the rotation center of the output member.

7. The actuator with reverse input blocking clutch according to claim 3, wherein the reverse input blocking clutch comprises two engaging elements configured by the engaging element.

8. The actuator with reverse input blocking clutch according to claim 3, wherein the reverse input blocking clutch comprises an elastic member configured to elastically bias the engaging element in a direction that brings the pressing surface closer to the pressed surface.

9. A steering device, comprising:
an actuator with reverse input blocking clutch having an output member; and
a linear motion mechanism having a rod that is supported so as to perform linear motion and is connected to steered wheels so that a direction of the steered wheels changes in accordance with the linear motion, the linear motion mechanism configured to convert rotational motion of the output member into linear motion of the rod; wherein
the actuator with reverse input blocking clutch is configured by the actuator with reverse input blocking clutch according to claim 1.

10. The steering device according to claim 9, wherein the rod comprises a spiral male ball screw groove on an outer peripheral surface thereof; and
the linear motion mechanism, further comprises:
a ball nut having a spiral female ball screw groove on an inner peripheral surface thereof and rotationally driven by the output member; and
a plurality of balls rotatably arranged between the male ball screw groove and the female ball screw groove.

11. The steering device according to claim 9, wherein the steered wheels are rear wheels.

12. A control method of a reverse input blocking clutch,
the reverse input blocking clutch including an input member that is rotatably driven by an actuator, and an output member that is connected to an output-side mechanism so as to transmit torque, and when torque is input to the input member from the actuator in a state in which torque is not reversely input to the output member from the output-side mechanism, is configured to transmit torque that is input to the input member to the output member; and when torque is reversely input to the output member from the output-side mechanism in a state in which torque is not input to the input member from the actuator, is configured to lock rotation of the output member;
the control method comprising:
in a case where a predetermined condition is met, switching the reverse input blocking clutch to a state in which torque can be transmitted between the input member and the output member, in a state in which torque is being reversely input to the output member from the output-side mechanism, by the actuator applying torque to the input member in an opposite direction to a direction of the torque being reversely input to the output member from the output side mechanism, and then continuously giving an instruction to the actuator to apply torque having a magnitude smaller than a magnitude of the torque being reversely input to the output member from the output side mechanism to the inner member in the opposite direction, transmitting the torque being reversely input to the output member from the output side mechanism to the input member.

* * * * *